United States Patent
Marvit et al.

(10) Patent No.: US 7,280,096 B2
(45) Date of Patent: Oct. 9, 2007

(54) MOTION SENSOR ENGAGEMENT FOR A HANDHELD DEVICE

(75) Inventors: David L. Marvit, San Francisco, CA (US); B. Thomas Adler, Menlo Park, CA (US); Hitoshi Matsumoto, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 10/807,558

(22) Filed: Mar. 23, 2004

(65) Prior Publication Data

US 2005/0212749 A1    Sep. 29, 2005

(51) Int. Cl.
*G09G 5/00*    (2006.01)

(52) U.S. Cl. ............... 345/156; 345/158; 715/863

(58) Field of Classification Search ........ 345/156–158; 715/856, 857, 863, 864
See application file for complete search history.

(56) References Cited

U.S. PATENT DOCUMENTS

| | | | |
|---|---|---|---|
| 4,812,831 A | 3/1989 | Laier | 340/711 |
| 5,112,785 A | 5/1992 | Brun et al. | 502/108 |
| 5,142,655 A | 8/1992 | Drumm | 379/52 |
| 5,506,605 A | 4/1996 | Paley | 345/163 |
| 5,543,588 A | 8/1996 | Bisset et al. | 178/18 |
| 5,598,187 A | 1/1997 | Ide et al. | 345/158 |
| 5,602,566 A | 2/1997 | Motosyuku et al. | 345/123 |
| 5,734,371 A | 3/1998 | Kaplan | 345/158 |
| 5,766,015 A | 6/1998 | Shpiro | 434/156 |
| 6,008,810 A | 12/1999 | Bertram et al. | 345/347 |
| 6,057,554 A | 5/2000 | Plesko | 250/566 |

(Continued)

FOREIGN PATENT DOCUMENTS

| GB | 2378878 | 2/2003 |
|---|---|---|

(Continued)

OTHER PUBLICATIONS

PCT Notification of Transmittal of the International Search Report and the Written Opinion of the International Searching Authority, or the Declaration, mailed Nov. 3, 2005, re PCT/US2005/007409 filed Mar. 7, 2005, 13 pages.

(Continued)

*Primary Examiner*—Regina Liang
(74) *Attorney, Agent, or Firm*—Baker Botts L.L.P.

(57) ABSTRACT

A motion controlled handheld device includes a display having a viewable surface and operable to generate an image. The device includes a motion detection module operable to detect motion of the device within three dimensions and to identify components of the motion in relation to the viewable surface. The device also includes a motion response module having a first mode of operation and a second mode of operation. The motion response module is operable in the first mode of operation to monitor the motion of the device, to determine that the motion matches a predetermined mode selection trigger, and, in response to determining that the motion matches the predetermined mode selection trigger, to measure a baseline orientation of the device based on measurements of the components, and to switch to the second mode of operation. The motion response module is operable in the second mode of operation to monitor the motion of the device, to determine movement of the device in relation to the baseline orientation using the components of the motion, and to modify the image in response to the movement.

19 Claims, 11 Drawing Sheets

U.S. PATENT DOCUMENTS

| | | | | |
|---|---|---|---|---|
| 6,088,023 | A | 7/2000 | Louis et al. | 345/173 |
| 6,121,960 | A | 9/2000 | Carroll et al. | 345/173 |
| 6,184,847 | B1 | 2/2001 | Fateh et al. | 345/8 |
| 6,201,554 | B1 | 3/2001 | Lands | 346/169 |
| 6,245,014 | B1 | 6/2001 | Brainard, II | 600/300 |
| 6,288,704 | B1 | 9/2001 | Flack et al. | 345/158 |
| 6,466,198 | B1 | 10/2002 | Feinstein | 345/158 |
| 6,564,144 | B1 | 5/2003 | Cherveny | 701/208 |
| 6,573,883 | B1* | 6/2003 | Bartlett | 345/156 |
| 6,791,536 | B2 | 9/2004 | Keely et al. | 345/173 |
| 6,834,249 | B2* | 12/2004 | Orchard | |
| 2002/0093483 | A1 | 7/2002 | Kaplan | 345/158 |
| 2002/0190947 | A1 | 12/2002 | Feinstein | 345/158 |
| 2004/0027330 | A1 | 2/2004 | Bradski | 345/158 |
| 2004/0061621 | A1 | 4/2004 | Ishida | 340/825.72 |
| 2004/0178995 | A1 | 9/2004 | Sterling | 345/173 |

FOREIGN PATENT DOCUMENTS

| | | |
|---|---|---|
| WO | WO 01/86920 | 11/2001 |
| WO | WO 03/001340 | 1/2003 |

OTHER PUBLICATIONS

Westeyn et al., "*Georgia Tech Gesture Toolkit: Supporting Experiments in Gesture Recognition*", ICMI '03, Vancouver, British Columbia, Canada, 8 pages, Nov. 5, 2003.

Yee, Ka-Ping, "*Peephole Displays: Pen Interaction on Spatially Aware Handheld Computers*", CHI 2003, Ft. Lauderdale, Florida, 8 pages, Apr. 5, 2003.

Patent Application entitled, "*Distinguishing Tilt and Translation Motion Components in Handheld Devices*", 68 pages specification, claims and abstract, 11 pages of drawings, inventors Marvit et al, Mar. 23, 2004.

Patent Application entitled, "*Handheld Device With Preferred Motion Selection*", 64 pages specification, claims and abstract, 11 pages of drawings, inventors Marvit et al, Mar. 23, 2004.

Patent Application entitled, "*Selective Engagement of Motion Detection*", 66 pages specification, claims and abstract, 11 pages of drawings, inventors Marvit et al, Mar. 23, 2004.

Patent Application entitled, "*Gesture Based Navigation of a Handheld User Interface*", 69 pages specification, claims and abstract, 11 pages of drawings, inventors Marvit et al, Mar. 23, 2004.

Patent Application entitled, "*Translation Controlled Cursor*", 66 pages specification, claims and abstract, 11 pages of drawings, inventors Reinhardt et al, Mar. 23, 2004.

Patent Application entitled, "*Selective Engagement of Motion Input Modes*", 66 pages specification, claims and abstract, 11 pages of drawings, inventors Marvit et al, Mar. 23, 2004.

Patent Application entitled, "*Feedback Based User Interface for Motion Controlled Handheld Devices*", 66 pages specification, claims and abstract, 11 pages of drawings, inventor Marvit, Mar. 23, 2004.

Patent Application entitled, "*Spatial Signatures*", 64 pages specification, claims and abstract, 11 pages of drawings, inventors Marvit et al, Mar. 23, 2004.

Patent Application entitled, "*Motion Controlled Remote Controller*", 65 pages specification, claims and abstract, 11 pages of drawings, inventors Marvit et al, Mar. 23, 2004.

Patent Application entitled, "*Gesture Identification of Controlled Devices*", 65 pages specification, claims and abstract, 11 pages of drawings, inventors Marvit et al, Mar. 23, 2004.

Patent Application entitled, "*Environmental Modeling for Motion Controlled Handheld Devices*", 65 pages specification, claims and abstract, 11 pages of drawings, inventors Marvit et al, Mar. 23, 2004.

Patent Application entitled, "*Gesture Based User Interface Supporting Preexisting Symbols*", 65 pages specification, claims and abstract, 11 pages of drawings, inventors Marvit et al, Mar. 23, 2004.

Patent Application entitled, "*Context Dependent Gesture Response*", 66 pages specification, claims and abstract, 11 pages of drawings, inventors Marvit et al, Mar. 23, 2004.

Patent Application entitled, "*Customizable Gesture Mappings for Motion Controlled Handheld Devices*", 67 pages specification, claims and abstract, 11 pages of drawings, inventors Marvit et al, Mar. 23, 2004.

Patent Application entitled, "*User Definable Gestures for Motion Controlled Handheld Devices*", 66 pages specification, claims and abstract, 11 pages of drawings, inventors Marvit et al, Mar. 23, 2004.

Patent Application entitled, "*Non-Uniform Gesture Precision*", 66 pages specification, claims and abstract, 11 pages of drawings, inventors Marvit et al, Mar. 23, 2004.

Patent Application entitled, "*Dynamic Adaptation of Gestures for Motion Controlled Handheld Devices*", 65 pages specification, claims and abstract, 11 pages of drawings, inventors Marvit et al, Mar. 23, 2004.

* cited by examiner

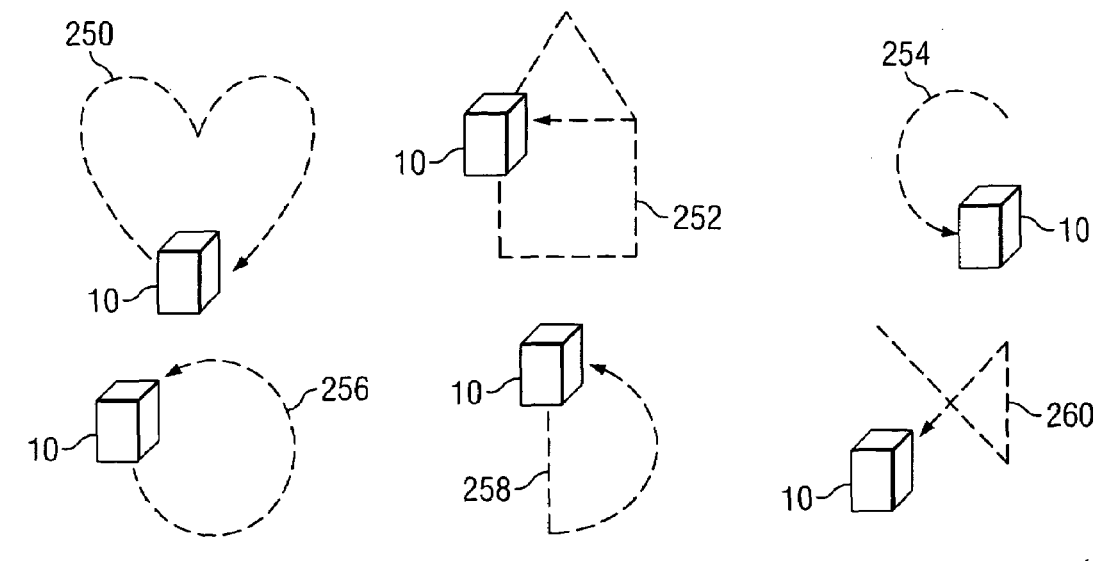
FIG. 17
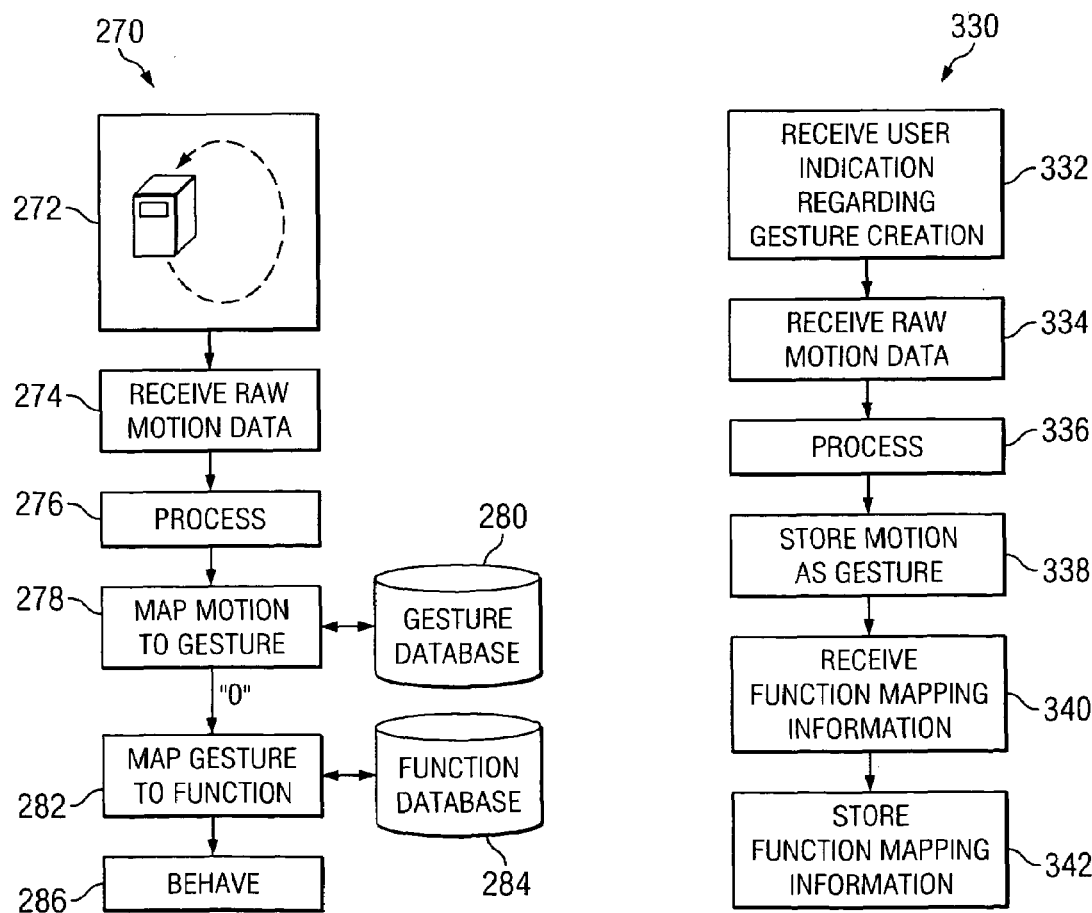
FIG. 18
FIG. 21

US 7,280,096 B2

MOTION SENSOR ENGAGEMENT FOR A HANDHELD DEVICE

TECHNICAL FIELD

The present invention relates generally to portable devices and, more particularly, to portable devices with a motion interface.

BACKGROUND

The use of computing devices, such as cellular phones and personal digital assistants (PDAs) has grown rapidly. Such devices provide many different functions to users through different types of interfaces, such as keypads and displays. Some computing devices utilize motion as an interface by detecting tilt of the device by a user. Some implementations of a motion interface involve tethering a computing device with fishing lines or carrying large magnetic tracking units that require large amounts of power.

SUMMARY

In accordance with the present invention, a handheld device with motion a motion interface is provided.

In accordance with a particular embodiment, a motion controlled handheld device includes a display having a viewable surface and operable to generate an image. The device includes a motion detection module operable to detect motion of the device within three dimensions and to identify components of the motion in relation to the viewable surface. The device also includes a motion response module having a first mode of operation and a second mode of operation. The motion response module is operable in the first mode of operation to monitor the motion of the device, to determine that the motion matches a predetermined mode selection trigger, and, in response to determining that the motion matches the predetermined mode selection trigger, to measure a baseline orientation of the device based on measurements of the components, and to switch to the second mode of operation. The motion response module is operable in the second mode of operation to monitor the motion of the device, to determine movement of the device in relation to the baseline orientation using the components of the motion, and to modify the image in response to the movement.

In accordance with another embodiment, a method for controlling a handheld device includes generating an image on a viewable surface of the handheld device, detecting motion of the device within three dimensions and identifying components of the motion in relation to the viewable surface. The method includes, in a first mode of operation, monitoring the motion of the device, determining that the motion matches a predetermined mode selection trigger, and in response to determining that the motion matches the predetermined mode selection trigger, measuring a baseline orientation of the device based on measurements of the components and switching to a second mode of operation. In the second mode of operation the method includes monitoring the motion of the device, determining movement of the device in relation to the baseline orientation using the components of the motion and modifying the image in response to the movement.

Technical advantages of particular embodiments of the present invention include a handheld device capable of receiving a trigger that both sets a zero-point and engages motion sensitivity for the device. The trigger may comprise any suitable input form. Accordingly, use of the device's motion interface capability around a user's body may be facilitated, and users may easily direct the device to ignore unintended motion.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 17 illustrates example gestures which may be mapped to different functions of a handheld device, in accordance with a particular embodiment;

FIG. 18 is a flowchart illustrating the utilization of a preexisting symbol gesture, in accordance with a particular embodiment;

FIG. 21 is a flowchart illustrating the assignment process for user-created gestures, in accordance with a particular embodiment;

DETAILED DESCRIPTION

Figure 1:
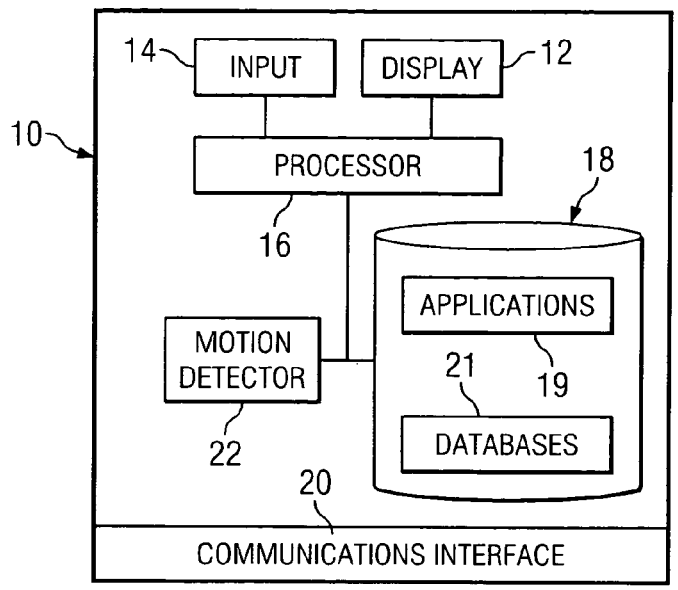
FIG. 1 illustrates a handheld device with motion interface capability, in accordance with a particular embodiment.

FIG. 1 illustrates a handheld device 10 with motion interface capability, in accordance with a particular embodiment of the present invention. Handheld device 10 can recognize movement of the device and can perform various functions corresponding to such movement. Thus, movement of the device operates as a form of input for the device. Such movement input may directly alter what is being displayed on a device display or may perform other functions. Handheld device 10 may comprise a mobile phone, personal digital assistant (PDA), still camera, video camera, pocket calculator, portable radio or other music or video player, digital thermometer, game device, portable electronic device, watch or any other device capable of being held or worn by a user. As indicated in the examples listed above, handheld device 10 may include wearable portable devices such as watches as well. A watch may include any computing device worn around a user's wrist.

Handheld device 10 includes a display 12, input 14, processor 16, memory 18, communications interface 20 and motion detector 22. Display 12 presents visual output of the device and may comprise a liquid crystal display (LCD), a light emitting diode (LED) or any other type of display for communicating output to a user. Input 14 provides an interface for a user to communicate input to the device. Input 14 may comprise a keyboard, keypad, track wheel, knob, touchpad, stencil or any other component through which a user may communicate an input to device 10. In particular embodiments, display 12 and input 14 may be combined into the same component, such as a touchscreen.

Processor 16 may be a microprocessor, controller or any other suitable computing device or resource. Processor 16 is adapted to execute various types of computer instructions in various computer languages for implementing functions available within system handheld device 10. Processor 16 may include any suitable controllers for controlling the management and operation of handheld device 10.

Memory 18 may be any form of volatile or nonvolatile memory including, without limitation, magnetic media, optical media, random access memory (RAM), read only memory (ROM), removable media or any other suitable local or remote memory component. Memory 18 includes components, logic modules or software executable by processor 16. Memory 18 may include various applications 19 with user interfaces utilizing motion input, such as mapping, calendar and file management applications, as further discussed below. Memory 18 may also include various databases, such as gesture databases and function or gesture mapping databases, as further discussed below. Components of memory 18 may be combined and/or divided for processing according to particular needs or desires within the scope of the present invention. Communications interface 20 supports wireless or wireline communication of data and information with other devices, such as other handheld devices, or components.

Motion detector 22 tracks movement of handheld device 10 which may be used as a form of input to perform certain functions. Such input movement may result from a user moving the device in a desired fashion to perform desired tasks, as further discussed below.

It should be understood that handheld device 10 in accordance with particular embodiments may include any suitable processing and/or memory modules for performing the functions as described herein, such as a control module, a motion tracking module, a video analysis module, a motion response module, a display control module and a signature detection module.

In particular embodiments, input movement may be in the form of translation and/or gestures. Translation-based input focuses on a beginning point and endpoint of a motion and differences between such beginning points and endpoints. Gesture-based input focuses on an actual path traveled by the device and is a holistic view of a set of points traversed. As an example, when navigating a map using translation-based input, motion in the form of an "O" may change the display during the movement but may ultimately yield no change between the information displayed prior to the movement and the information displayed at the end of the movement since the device presumably will be in the same point as it started when the motion ends. However, in a gesture input mode the device will recognize that it has traveled in the form of an "O" because in gesture-based input the device focuses on the path traveled during the motion or movement between a beginning point and an endpoint of the gesture (e.g., even though the beginning and endpoints may be the same). This gesture "O" movement may be mapped to particular functions such that when the device recognizes it has traveled along a path to constitute an "O" gesture, it may perform the functions, as further elaborated upon below. In particular embodiments, movement of the device intended as a gesture may be recognized as by the device as a gesture by matching a series, sequence or pattern of accelerations of the movement to those defining gestures of a gesture database.

Handheld devices in accordance with other embodiments may not include some of the components of the device illustrated in FIG. 1. For example, some embodiments may include a handheld device 10 without an input 14 separate from a motion detector such that motion of the device provides the sole or primary input for the device. It should be noted that handheld devices in accordance with other embodiments may include additional components not specifically illustrated with respect to device 10.

Figure 2:
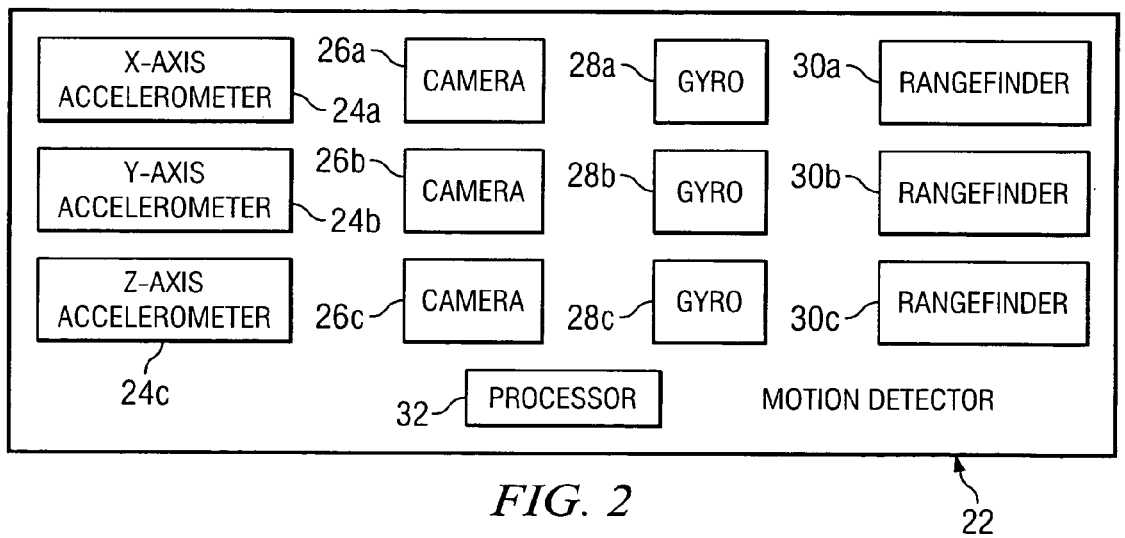
FIG. 2 illustrates a motion detector of the handheld device of FIG. 1, in accordance with a particular embodiment.

FIG. 2 illustrates motion detector 22 of FIG. 1, in accordance with a particular embodiment of the present invention. In this embodiment, motion detector 22 includes accelerometers 24a, 24b and 24c; cameras 26a, 26b and 26c; gyros 28a, 28b and 28c; rangefinders 30a, 30b and 30c; and a processor 32.

Accelerometers 24a, 24b and 24c detect movement of the device by detecting acceleration along a respective sensing axis. A particular movement of the device may comprise a series, sequence or pattern of accelerations detected by the accelerometers. When the handheld device is tilted along a sensing axis of a particular accelerometer, the gravitational acceleration along the sensing axis changes. This change in gravitational acceleration is detected by the accelerometer and reflects the tilt of the device. Similarly, translation of the handheld device, or movement of the device without rotation or tilt also produces a change in acceleration along a sensing axis which is also detected by the accelerometers.

In the illustrated embodiment, accelerometer 24a comprises an x-axis accelerometer that detects movement of the device along an x-axis, accelerometer 24b comprises a y-axis accelerometer that detects movement of the device along a y-axis and accelerometer 24c comprises a z-axis accelerometer that detects movement of the device along a z-axis. In combination, accelerometers 24a, 24b and 24c are able to detect rotation and translation of device 10. As indicated above, rotation and/or translation of device 10 may serve as an input from a user to operate the device.

The use of three accelerometers for motion detection provides certain advantages. For example, if only two accelerometers were used, the motion detector may not be able to disambiguate translation of the handheld device from tilt in the plane of translation. However, using a third, z-axis accelerometer (an accelerometer with a sensing axis at least approximately perpendicular to the sensing axes of the other two accelerometers) enables many cases of tilt to be disambiguated from many cases of translation.

It should be understood that some unique movements may exist that may not be discernible from each other by accelerometers 24a, 24b and 24c. For example, movement comprising a certain rotation and a certain translation may appear to accelerometers 24a, 24b and 24c as the same movement as a different movement that comprises a different particular rotation and a different particular translation. If a motion detector 22 merely included three accelerometers to detect movement (without any additional components to ensure greater accuracy), some unique, undiscernible movements may be mapped to the same function or may not be mapped to a function to avoid confusion.

As indicated above, motion detector 22 also includes cameras 26a, 26b and 26c, which may comprise charge coupled device (CCD) cameras or other optical sensors. Cameras 26a, 26b and 26c provide another way to detect movement of the handheld device (both tilt and translation). If only one camera were installed on a device for movement detection, tilt of the device may be indistinguishable from translation (without using other motion detection components, such as accelerometers). However, by using at least two cameras, tilt and translation may be distinguished from each other. For example, if two cameras were installed on handheld device 10 (one on the top of the device and one on the bottom of the device), each camera would see the world moving to the right when the device was translated to the left. If the device is lying horizontally and is rotated by lifting its left edge while lowering its right edge, the camera on the bottom will perceive the world as moving to the right while the camera on the top will perceive the world as moving to the left. Thus, when a device is translated, cameras on opposite surfaces will see the world move in the same direction (left in the example given). When a device is rotated, cameras on opposite surfaces will see the world move in opposite directions. This deductive process can be reversed. If both cameras see the world moving in the same direction, then the motion detector knows that the device is being translated. If both cameras see the world moving in opposite directions, then the motion detector knows that the device is being rotated.

When the device is rotated, the magnitude of the movement of the world to the cameras is directly related to the magnitude of the rotation of the device. Thus, the amount of the rotation can accurately be determined based on such movement of the world to the cameras. However, when the device is translated, the magnitude of the translation is related to both the magnitude of the movement of the world to the cameras and to the distance to the objects in the field of view of the cameras. Therefore, to accurately determine amount of translation using cameras alone, some form of information concerning the distance to objects in the camera fields of view must be obtained. However, in some embodiments cameras with rangefinding capability may be used.

It should be understood that even without distance information, optical information can be of significant value when correlated against the information from accelerometers or other sensors. For example, optical camera input may be used to inform the device that no significant motion is taking place. This could provide a solution to problems of drift which may be inherent in using acceleration data to determine absolute position information for certain device functions.

As discussed above, distance information may be useful to determine amount of translation when cameras are being used to detect movement. In the illustrated embodiment, such distance information is provided by rangefinders 30a, 30b and 30c. Rangefinders 30a, 30b and 30c may comprise ultrasound rangefinders, laser rangefinders or any other suitable distance measuring component. Other components may also be used to determine distance information. For example, cameras with rangefinding capability may be used, and multiple cameras may be utilized on the same side of the device to function as a range-finder using stereopsis. Determined distance information allows for accurate and explicit computation of the portion of any apparent translation that is due to translation and the portion that is due to rotation.

As indicated above, motion detector 22 additionally includes gyros 28a, 28b and 28c. Gyros 28a, 28b and 28c are used in combination with the other components of motion detector 22 to provide increased accuracy in detecting movement of device 10.

Processor 32 processes data from accelerometers 24, cameras 26, gyros 28 and rangefinders 30 to produce an output indicative of the motion of device 10. Processor 32 may comprise a microprocessor, controller or any other suitable computing device or resource, such as a video analysis module for receiving a video stream from each camera. In some embodiments, the processing described herein with respect to processor 32 of motion detector 22 may be performed by processor 16 of handheld device 10 or any other suitable processor, including processors located remote to the device.

As discussed above, motion detector 22 includes three accelerometers, three cameras, three gyros and three rangefinders. Motion detectors in accordance with other embodiments may include fewer or different components than motion detector 22. For example, some embodiments may include a motion detector with three accelerometers and no cameras, gyros or rangefinders; two or three accelerometers and one or more gyros; two or three accelerometers and one or more cameras; or two or three accelerometers and one or more rangefinders. In addition, the location of the motion detection components on the device may vary on different embodiments. For example, some embodiments may include cameras on different surfaces of a device while other embodiments may include two cameras on the same surface (e.g., to add rangefinding functionality).

Altering the type, number and location of components of motion detector 22 may affect the ability of motion detector to detect or accurately measure various types of movement. As indicated above, the type and number of components of motion detectors may vary in different embodiments in order to fulfill particular needs. Fewer or less accurate components may be used in particular embodiments when it is desired to sacrifice accuracy to reduce manufacturing cost of a handheld device with motion detection capabilities. For example, some handheld devices may only need to detect that the device has been translated and may not need to detect exact amount of such translation to perform desired functions of the device. Such handheld devices may thus include a motion detector with cameras and without any sort of rangefinder or other component providing distance information. In particular embodiments, components described above, such as cameras and rangefinders, may also be used for other purposes by the device than those described above relating to motion detection functionality.

Figure 3:
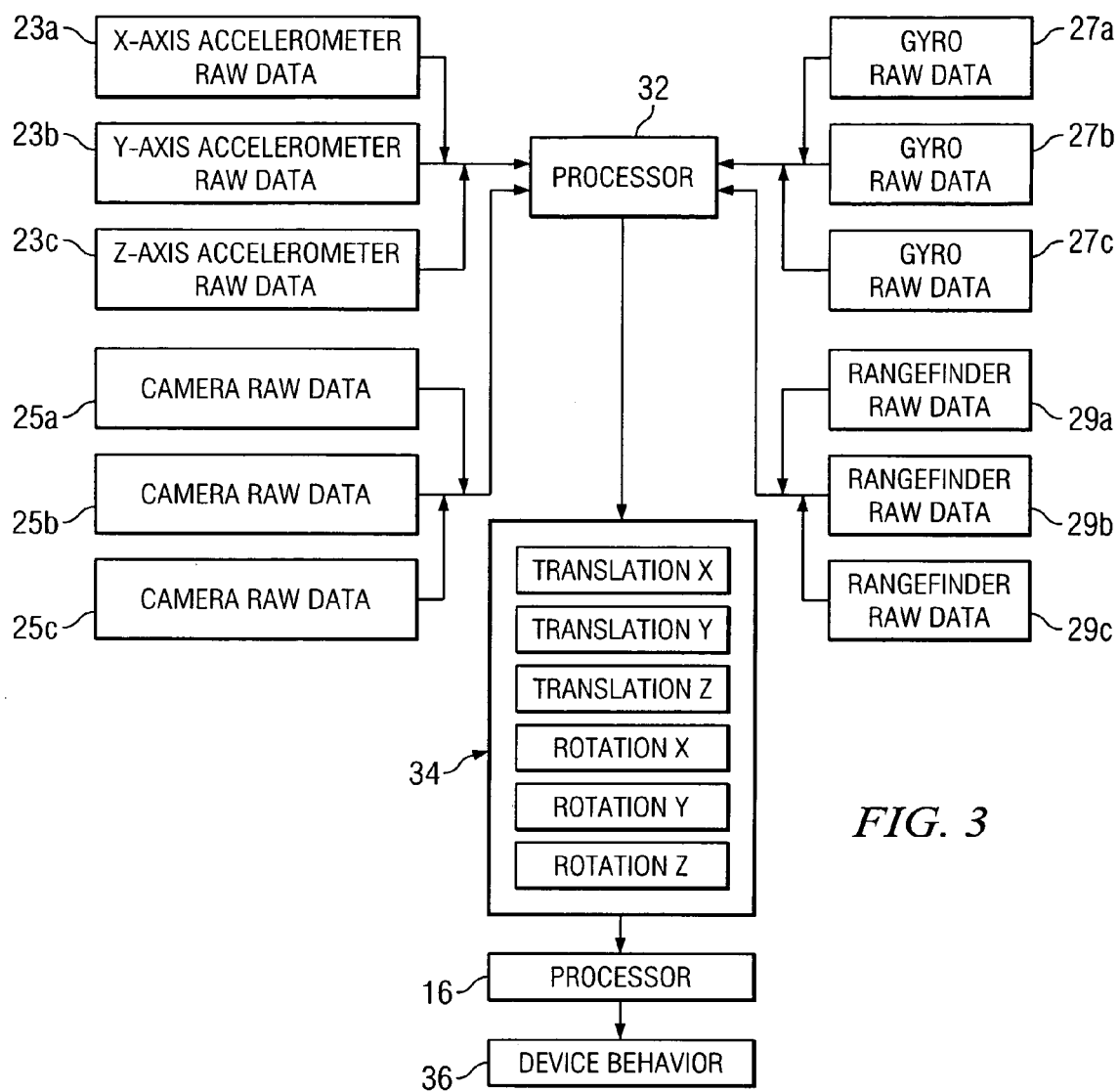
FIG. 3 illustrates the use of motion detector components of the handheld device of FIG. 1, in accordance with a particular embodiment.

FIG. 3 is a diagram illustrating the use of the motion detector components of handheld device 10 of FIG. 1. Raw data from motion detection components is processed at processor 32. Such raw data includes x-axis accelerometer raw data 23a, y-axis accelerometer raw data 23b and z-axis accelerometer raw data 23c from accelerometers 24a, 24b and 24c, respectfully; camera raw data 25a, camera raw data 25b and camera raw data 25c from cameras 26a, 26b and 26c, respectfully; gyro raw data 27a, gyro raw data 27b and gyro raw data 27c from gyros 28a, 28b and 28c; and rangefinder raw data 29a, rangefinder raw data 29b and rangefinder 29c from rangefinders 30a, 30b and 30c, respectively. If the handheld device includes more, fewer or different motion detection components as may be the case in some embodiments, the raw data may correspond to the components included.

The raw data is processed at processor 32 to produce motion detector output 34 identifying movement of device 10. In the illustrated embodiment, motion detector output 34 comprises translation along x, y and z axes and rotation with respect to the x, y and z axes. The motion detector output is communicated to a processor 16 of the handheld device which identifies the operation, function or task the device should perform (i.e., device behavior 36) based on the device motion. The performance of certain operations, functions or tasks based on particular movements is further discussed below.

Figure 4:
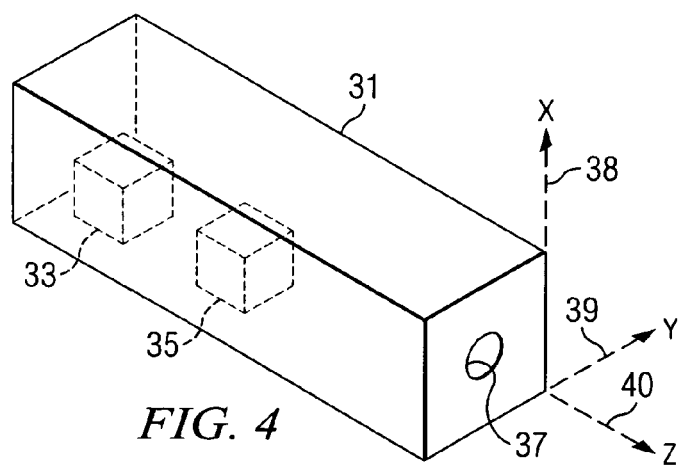
FIG. 4 illustrates an example handheld device with motion detection capability, in accordance with a particular embodiment.

FIG. 4 is an isometric illustration of an example handheld device 31 with motion detection capability, in accordance with particular embodiments. Handheld device 31 includes an x-axis accelerometer 33, a y-axis accelerometer 35 and a camera 37 oriented towards the z-axis. X-axis 38, y-axis 39 and z-axis 40 are also illustrated with respect to device 31 for reference. Handheld device 31 may detect movement, including tilt and translation in various directions, using accelerometers 33 and 35 and camera 37. Handheld device 31 may also include other components, such as components illustrated and described above with respect to handheld device 10, such as display 12, input 14, processor 16, memory 18 and communications interface 20. As indicated above, particular embodiments may include handheld devices having various types of motion detection components (including accelerometers, gyros, cameras, rangefinders or other suitable components) in any combination and positioned or oriented in any suitable manner upon the devices.

In particular embodiments, a user interface function may utilize input motion along one axis of motion at a time. For example, a device application may allow a user to scroll through a list displayed on the handheld device by moving the device along a particular axis (e.g., in one direction or in two opposite directions). It may be very difficult for a user to constrain the motion of the device to that particular axis as desired. In other words, some user generated device rotation or movement along another axis may be difficult to avoid. To counter this problem, the device may include preferred motion selection including the selection and amplification of a dominant motion and the minimization of movement in other directions or axes.

Figure 5:
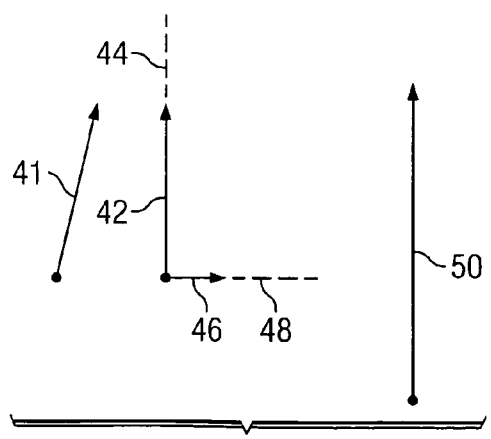
FIG. 5 illustrates an example of selection and amplification of a dominant motion of a handheld device, in accordance with a particular embodiment.

FIG. 5 illustrates an example of selection and amplification of a dominant motion and minimization of movement in another direction as discussed above. In the illustrated example, actual motion 41 represents movement of a handheld device. Actual motion 41 comprises movement 42 along one axis 44 and movement 46 along another axis 48 perpendicular to axis 44. Since the amount of movement 42 is greater than the amount of movement 46, the handheld device may select movement 42 as the dominant motion. The handheld device may then amplify this dominant motion and minimize movement 46 (the other motion) such that actual motion 41 is treated by the device as represented motion 50. The amount or size of amplification of the dominant motion may vary in various embodiments according to particular factors, such as the particular application being run on the device at the time. Moreover, amplification of a dominant motion may also be based on magnitude of acceleration, speed of motion, ratio of a motion in one direction (e.g., movement 42) to motion in another direction (e.g., movement 46), size of underlying desktop being navigated or user preferences. In some embodiments, a handheld device may implement preferred motion selection only when certain motion characteristics occur. For example, in some cases the handheld device may select and amplify a dominant motion if motion in one axis is more than two times greater than any other motion. The other, smaller motion may then be minimized.

The selection and amplification of the dominant motion and minimization of other motion may further expand a user's ability to take advantage of motion user interfaces and may also allow the handheld device, or applications running on the device, to filter out undesired, user-induced noise. With this capability, the user may be able to, for example, move the device left to pick a list to examine, then scroll that list by moving up and down. Motion along inappropriate axes may be ignored or substantially reduced by the device.

In particular embodiments, the selection and amplification of a dominant motion and minimization of other motion may also be applied to rotational motion of the device. Dominant motion around an axis may be selected and amplified in the same manner as motion along an axis as described above with respect to translational motion. Moreover, rotation around another axis (that is not dominant rotation) may be minimized.

Figure 6:
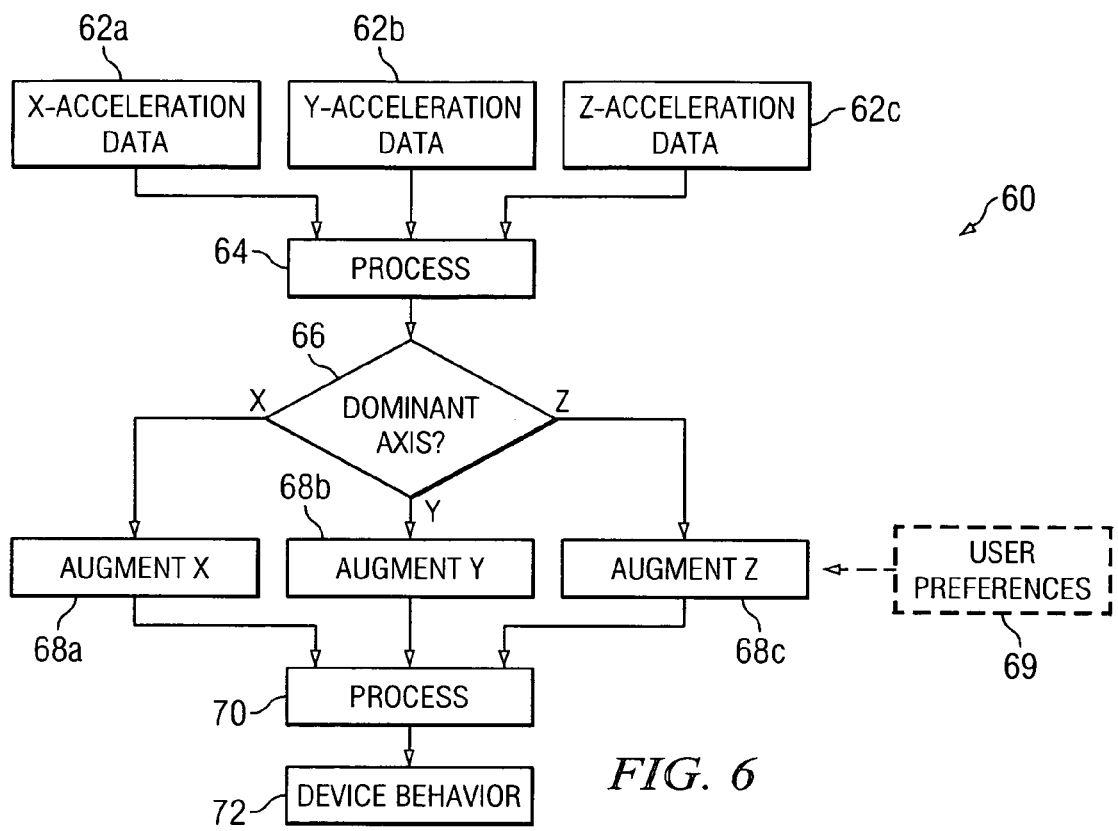
FIG. 6 is a flowchart illustrating preferred motion selection, in accordance with a particular embodiment.

FIG. 6 illustrates a preferred motion selection flowchart 60, in accordance with a particular embodiment of the present invention. In flowchart 60, raw data corresponding to movement of a handheld device is received. In the illustrated embodiment, the movement raw data includes x-acceleration data 62a, y-acceleration data 62b and z-acceleration data 62c that is processed at step 64 to yield an output indicating movement of the device. Other embodiments may include other types of movement raw data, such as optical or camera data, gyro data and/or rangefinder data. After the processing of the raw acceleration data 62, a dominant axis of motion is selected at step 66. If the selected dominant axis of motion is the x-axis, then the movement along the x-axis is augmented at step 68*a*. If the selected dominant axis of motion is the y-axis, then the movement along the y-axis is augmented at step 68*b*. If the selected dominant axis of motion is the z-axis, then the movement along the z-axis is augmented at step 68*c*. The amount of augmentation of movement in the dominant axis of motion may vary in different embodiments according to the application being utilized or other characteristics. In some embodiments, user preferences 69 may be utilized to determine type or amount of movement augmentation. Movement along axes other than the dominant axis of motion may be minimized as discussed above, such that such movement is ignored by a particular application in use. At step 70, the augmented movement is processed to yield device behavior 72. This processing step may include accessing an application being used to determine the particular device behavior to perform based on the augmented movement. Augmented movement may yield any of a number of types of device behavior according to the application in use, a particular user or otherwise.

For particular user interfaces utilizing motion input, there may be value in having the position of a virtual display, or the information displayed at display 12 of handheld device 10, linked to the position of the device. For example, in particular embodiments using translation-based input such as for navigating a map displayed at the device, the position of the handheld device may directly determine the portion of the map displayed at display 12. However, if device position information is kept in absolute terms (e.g., as with global positioning satellite (GPS) based systems) the utility for many tasks such as map or menu navigation may be impaired. Thus, it is beneficial in certain circumstances to define a "zero point," or an origin in a local context, that may be used to determine the behavior of the device. For example, if a zero point is defined when the device is at a point A, then motion between point A and a point B may be used as input. Particularly useful applications of setting a zero point may include external behaviors such as moving the virtual display or locating applications in the space around a user's body. Setting a zero point also addresses internal behaviors such as instructing the device to ignore the gravitational acceleration at the current orientation to allow the device to act only on additional, and presumably user generated, accelerations.

Handheld devices according to particular embodiments may include application user interfaces that utilize motion input only at certain times. At other times, for example, the motion of the device may not be utilized as input, and it may be useful to disengage or "turn off" motion sensitivity or the motion detection capability of the device. Disengagement of motion sensitivity may comprise, for example, deactivation of motion detector 22 of device 10 or other component, such as a motion response module of the device. Particular embodiments thus allow for the selective engagement and disengagement of the motion sensitivity of the device.

As an example, a motion response module which modifies display 12 based on motion detected at motion detector 22, may have a mode of operation in which it awaits a trigger for switching to another mode of operation in which motion sensitivity is enabled. When motion sensitivity is not enabled, any motion of the device may be disregarded. The trigger may also set a zero-point for the device. When the zero-point is set, the motion response module may measure a baseline orientation of the device based on measurement from motion detection components. The baseline orientation may comprise the position of the device (determined from information from motion detector components) when the trigger is received. Future movement of the device will be compared against the baseline orientation to determine the functions to perform or the modifications which should be made at display 12 based on the user's motion of the device.

Particular embodiments provide for any number of user-initiated actions to act as a single trigger for zero-point selection and selective engagement/disengagement of the motion sensitivity of the device. Such actions may include, for example, the pressing of a key on input 14, moving device 10 in a particular way (e.g., movement corresponding to a particular gesture), and tapping display 12. It should be understood that any user-initiated action may set a zero-point and engage motion sensitivity of the device at the same time.

Figure 7:
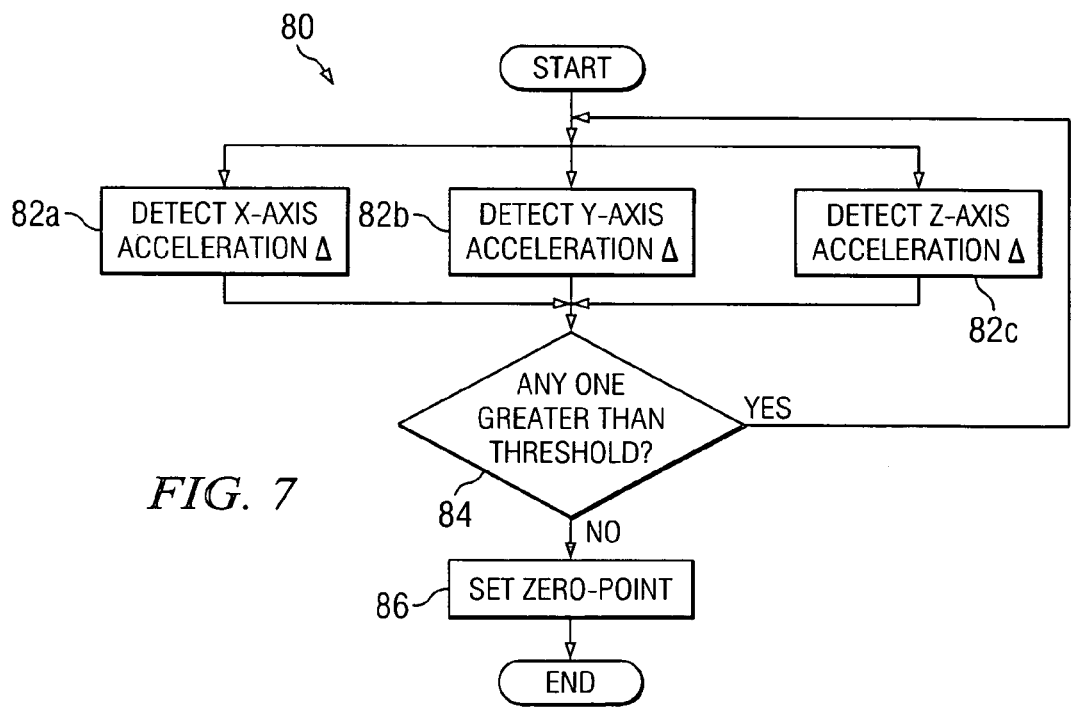
FIG. 7 is a flowchart illustrating the setting of a zero-point for a handheld device, in accordance with a particular embodiment.

In some embodiments, a period of inactivity or minimal activity (i.e., relative stillness) may also set a zero-point and engage or disengage motion sensitivity. FIG. 7 illustrates a flowchart 80 for the passive setting of a zero-point for a handheld device. Change in acceleration with respect to an x-axis is detected at step 82*a*, change in acceleration with respect to a y-axis is detected at step 82*b* and change in acceleration with respect to a z-axis is detected at step 82*c*. At steps 84*a*, 84*b* and 84*c*, it is determined whether any acceleration change detected is greater than a particular respective threshold. If detected acceleration change along each of the three axes is not greater than a set threshold, then the device may be considered at rest, and at step 86 a zero-point will be set. An at rest position may be determined, for example, from stabilization of the raw data or motion components of components of motion detector 22. However, if detected acceleration change along any of the three axes is greater than a set threshold, then the process returns to acceleration change detection at steps 82. Thus, this method of passively setting a zero-point may ensure that when the handheld device is at rest, a zero point will be set. Moreover, if a device is in constant motion but not being moved by a user at a particular time (e.g., resting in a train moving at a constant speed), a zero-point will be set since there will be no detected change in acceleration. The use of thresholds to determine whether an acceleration change is high enough so as not to trigger the setting of a zero-point enables a user to hold the device still to passively set the zero-point. Otherwise, this may be difficult since a device with highly sensitive accelerometers may detect acceleration change as a result of very minor unintended, user-initiated movement. It should be understood that similar methods may be used in connection with motion detectors with components other than accelerometers. Thresholds may also be used in such similar methods to account for small, unintended movements that may otherwise prevent setting of a zero point.

Particular embodiments of the present invention include the ability to allow a user to repeatedly selectively engage and disengage the motion sensitivity of the handheld device in order to allow greater movement through a virtual desktop (or information space) using motion input in a limited amount of physical space. This process can be analogized to "scrubbing" with a mouse controlling a cursor, or lifting the mouse off of a surface and replacing the mouse on the surface at a different location to allow greater movement of the cursor. Lifting the mouse breaks the connection between the motion of the mouse and the motion of the cursor. Similarly, a user may be able to engage and disengage the connection between the motion of a handheld device, such as device 10, and the operations, functions or actions based on movement of the device.

Figure 8:
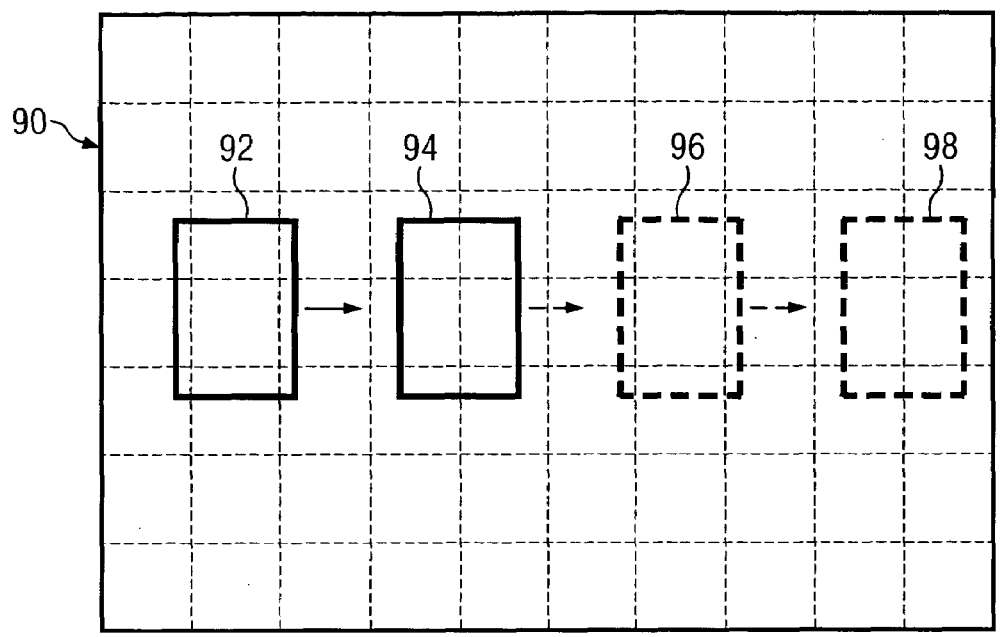
FIG. 8 illustrates an example of scrubbing functionality with a handheld device for virtual desktop navigation, in accordance with a particular embodiment.

FIG. 8 illustrates an example of the use of scrubbing functionality to navigate across a virtual desktop, or information space, larger than the display of a handheld device. In the illustrated example, a handheld device is used to navigate through virtual desktop 90. Virtual desktop 90 is illustrated as a grid map and may represent any suitable information through which a user may desire to navigate. Information of virtual desktop displayed at the handheld device is represented by box 92. In this embodiment, translation of the handheld device is used to navigate through virtual desktop 90. For example, a user may move the handheld device from right to left to navigate from right to left through information of virtual desktop 90. It should be understood that while the example illustrated describes moving the device to the right to implement the scrubbing process, it should be understood that handheld devices of particular embodiments may be moved in any suitable manner to implement the scrubbing process.

As indicated above, box 92 represents the information of virtual desktop 90 currently displayed at the device. If a user desired to view information represented at box 94, the user may move the handheld device from left to right. For purposes of this example, imagine that the user moves the device to the right, and the information of virtual desktop 90 contained in box 94 is displayed at the device. Also imagine that the user's arm is now outstretched to the user's right such that the user must walk or otherwise move further right in order to view at the display of the device information of virtual desktop 90 that is to the right of box 94. If this were the case, and the user could not, or did not desire to, walk or otherwise move further to the right so that the device would be moved further to the right, then the user could selectively disengage the motion sensitivity of the handheld device, move the device back to the left, selectively reengage the motion sensitivity of the device and move the device back to the right to display information to the right of box 94. In this manner, the user could display information of virtual desktop 90 contained in box 96, and this process could be repeated to display information contained in box 98, which is further to the right of box 96.

The selective disengagement and reengagement of the motion sensitivity of the device in order to allow greater movement within a virtual desktop in a limited amount of physical space may be enabled in any of a variety of ways, such as by a key on an input of the device, moving the device according to a particular gesture or movement (e.g., an arc movement) or tapping the device display. Any other user-initiated action may be used to disengage and reengage motion sensitivity for this purpose. Particular embodiments may allow multiple actions to disengage and reengage motion sensitivity of the device. Moreover, a user action that disengages motion sensitivity of the device may be different from a user action that reengages motion sensitivity. This scrubbing process may be performed in any suitable application, such as map navigation, menu navigation and scrolling through a list.

Figure 9:
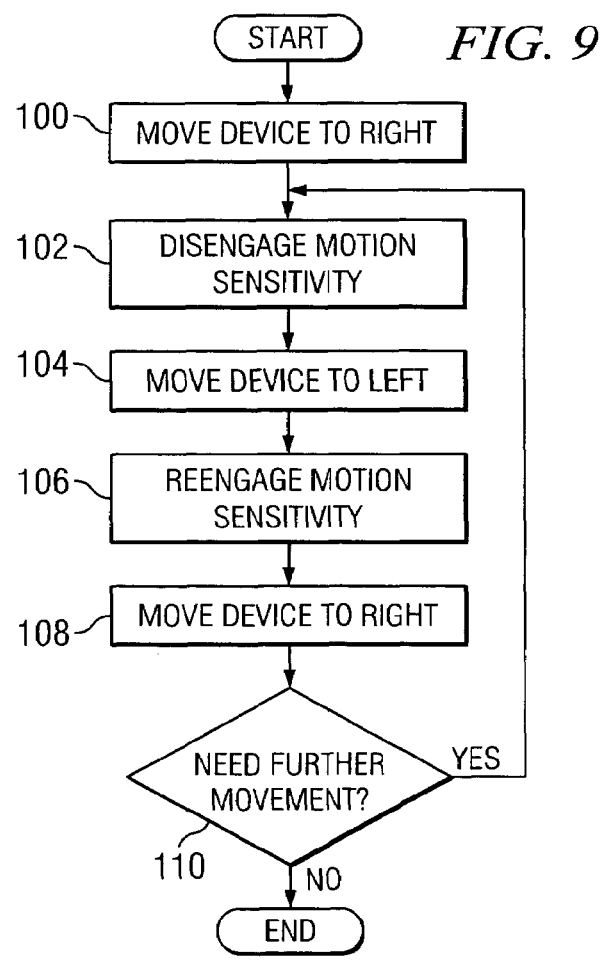
FIG. 9 is a flowchart illustrating the scrubbing process of FIG. 8, in accordance with a particular embodiment.

FIG. 9 is a flowchart illustrating the steps of the scrubbing process described above with respect to FIG. 8, in accordance with a particular embodiment. The flowchart begins at step 100, where the handheld device is moved to the right to go from displaying information of box 92 of virtual display 90 to information of box 94. As indicated above, the user may desire to display information further to the right of box 94 but may have run out of physical space to move the device further to the right. Thus, the user disengages the motion sensitivity of the device at step 102. Any suitable user action may perform such disengagement, such as the pressing of a button on the device or moving the device according to a particular gesture. At step 104, the user moves the device to the left so that the user will have more physical space through which the user may move the device to the right when motion sensitivity is reengaged.

At step 106, the user reengages motion sensitivity of the device. Again, such reengagement may be performed by any suitable user action, and such user action may be different from the user action performed to disengage motion sensitivity in step 102. Since motion sensitivity has been reengaged, the user moves the device to the right at step 108 in order to change the information being displayed at the device from the information of box 94 to the information of box 96. At step 110, it is determined whether further movement of the device to the right is needed. If further movement is needed (e.g., to display the information of virtual display 90 in box 98), then the process returns to step 102 where motion sensitivity of the device is again disengaged. If no further movement is needed, then the process ends. As indicated above, this scrubbing process may be utilized in any suitable application of the device that supports motion input, and the device may be moved in any suitable manner in order to implement this functionality.

As indicated above, a particular movement of the device (e.g., a particular gesture) may be utilized in the scrubbing process to signal to the device not to change the information presented on the display during such movement. This allows the user to return the device to a position from which the user may move the device to further change the information presented on the display. For example, the device may be at a base reference position from which movement of the device changes the information displayed. A particular predetermined movement (e.g., an arc movement) may be used which may signal to the device not to change the information displayed based on motion until the movement is completed. Once the predetermined movement is completed, the base reference position may be reset such that future movement of the device from the base reference position further changes the information displayed. The base reference position may identify a baseline orientation of the device represented by baseline components of the motion data received by the motion detection components of the device. In particular embodiments, gestures may be received, as determined by movement from the base reference position, to perform particular commands which change the information displayed at the device.

As discussed with respect to various embodiments described above, handheld devices in accordance with particular embodiments may utilize multiples types or modes of input to operate the device. Such input modes include motion input modes, such as a translation input mode and a gesture input mode. While multiple input modes may sometimes be used in combination with each other, in some cases the handheld device may be set to recognize a certain mode type at one time. In some situations, the handheld device may be set to function based on multiple types of non-motion input and only one type of motion input (e.g., translation or gesture) at a particular time.

To facilitate this flexibility of the handheld device in recognizing multiple input modes, in particular embodiments a certain trigger may be used to switch between input modes. For example, a user may press a particular key or may move the device in a certain manner (e.g., a particular gesture) to switch input modes. In some cases where an application of the device recognizes and functions based upon multiple types of motion input, a particular key may be pressed or a particular gesture may be formed using the device to switch between a translation motion input mode and a gesture motion input mode. The trigger may also comprise the mere switch from one application to another or the switch from one displayed image to another. In some situations, the trigger may switch between a non-motion input mode and a motion input mode. Any particular user-action may be implemented to act as a trigger to switch between different input modes, such as between different motion input modes. In some embodiments, a voice command or physical action upon the device (e.g., a device or screen tap) may be utilized to switch input modes.

In particular embodiments, a user action that reengages motion sensitivity of a device may also contain other information that might otherwise affect device behavior. For example, if a user makes one motion to reengage translation sensitivity, it may render the device more sensitive to motion than if the user makes a different motion to reengage motion sensitivity. A reengaging motion may comprise a gesture that indicates the user's identity or context, thereby engaging a variety of operational settings, such as user preferences.

As indicated above, particular embodiments include the ability to receive motion input to control various functions, tasks and operations of a handheld device and may be used to alter information displayed at the device in the process. In some cases, such motion input may be in the form of gestures, as opposed to mere translation-based input. Gesture input may be used to navigate through a multidimensional menu or grid in some applications. For example, as discussed above with respect to the scrubbing process, a display of a handheld device may be smaller than the amount of information (e.g., menu options, map information) that can be presented on the display. This may lead to a menu structure that is narrow and deep. In many cases, broad, shallow menu structures may be preferred over a narrow, deep menu structure because a user is not required to remember as much information concerning where functionalities are located.

Figure 10A:
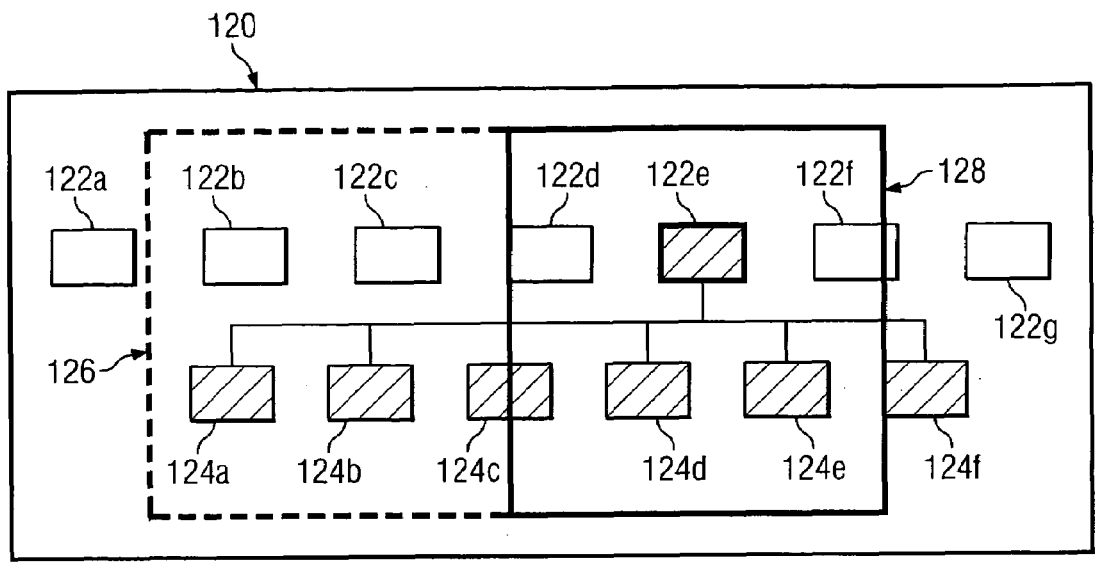
FIG. 10A illustrates an example of menu navigation using gesture input, in accordance with a particular embodiment.

FIG. 10A illustrates an example of menu navigation using gesture input, in accordance with a particular embodiment. In the illustrated embodiment, a handheld device is used to navigate through virtual desktop 120. Virtual desktop 120 includes a menu tree with menu categories 122 for selection. Each menu category 122 may include respective sub-categories for selection. In some embodiments, menu categories 122 may comprise categories of functions, while sub-categories of each menu selection may include the actual functions under each such category. In other embodiments, menu categories may comprise nouns (e.g., "folder," "document," "picture"), while sub-categories comprise verbs (e.g., "move," "paste," "cut"). If the handheld device comprised a cellular phone, menu categories 122 may include "calls," "phone book," "messages," "planner," "sounds," "setup" or other items. Each menu category 122 may include functions which may be accessed once a menu category 122 is selected. While two menu levels are illustrated in FIG. 10A, it should be understood that a multidimensional desktop or display of information for motion interface navigation may include any number of selections (e.g., menus) utilizing any number of levels.

In the illustrated example, menu category 122e has been selected, and sub-categories 124 of menu category 122e are displayed as available for selection. Boxes 126 and 128 represent information displayed at the handheld device for the user. As illustrated, virtual desktop 120 includes more information, or menus, which can be displayed at the device at one time. A user may move the device according to particular gestures to navigate across or through the virtual desktop. Gestures may also be used to navigate through different menu levels and to make menu selections. As an example, a user may move device 10 in the form of a clockwise circle 130 to navigate a predetermined amount to the right across virtual desktop 120 (e.g., moving from information of box 126 to information of box 128). A particular menu category 122 may be selected by an away gesture 132, or a downward gesture (e.g., to select menu category 122e), and thus display sub-categories 124 for selection. Similarly, to move to the left across virtual desktop 120, a user may move device 10 in the form of a counterclockwise circle 134. In some cases, navigation may be accomplished through four gestures: a forward gesture, a backward gesture, a left gesture and a right gesture. In some embodiments, gestures comprising motion vectors in perpendicular directions may be used for navigation.

In particular embodiments, gestures may be used that are mirror images of other used gestures to execute opposite functions from those accomplished by the other gestures. For example, a motion toward a user might zoom in while an opposite motion, a motion away from the user, may zoom out. Using mirror image or reciprocal gestures mapped to opposite functions may make a motion user interface for a device easier to learn and to use.

In some cases, the menu item at the center of the display may be highlighted for selection, while in other cases a particular gesture may indicate which menu selection of a plurality of displayed selections a user desires to select. It should be understood that the menus or other information through which a user may navigate using gestures may be presented at the handheld device in any number of ways. In some embodiments, only one level of information (i.e., one menu level) may be displayed at once, while sub-levels or higher levels are not displayed until they are available for selection.

Figure 10B:
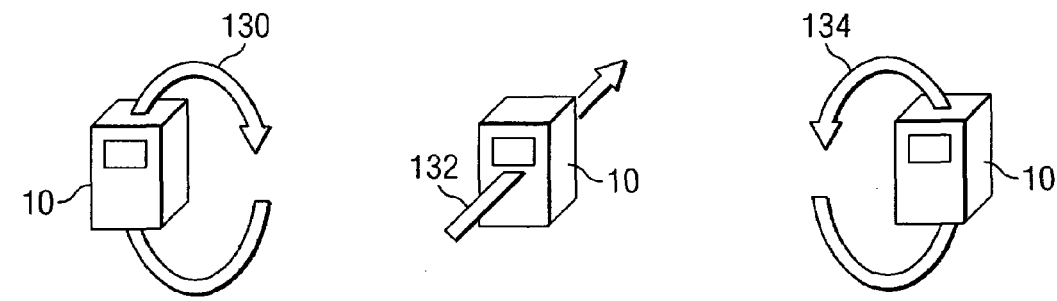
FIG. 10B illustrates example gestures which may be used to perform various functions at a handheld device, in accordance with a particular embodiment.

FIG. 10B illustrates example gestures which may be utilized to perform various functions, such as functions enabling a user to navigate through a virtual desktop. The illustrated example gestures include an "up" gesture 133 to navigate in an upward direction through the desktop, a "down" gesture 135 to navigate down, a "left" gesture 136 to navigate left, a "right" gesture 137 to navigate right, an "in" gesture 138 to navigate in a direction towards the user and an "out" gesture 139 to navigate away from the user. It should be understood that these are mere example gestures and commands for particular embodiments, and other embodiments may include different gestures or similar gestures mapped to different commands for navigating through a desktop or performing other functions with a handheld device.

Figure 11:
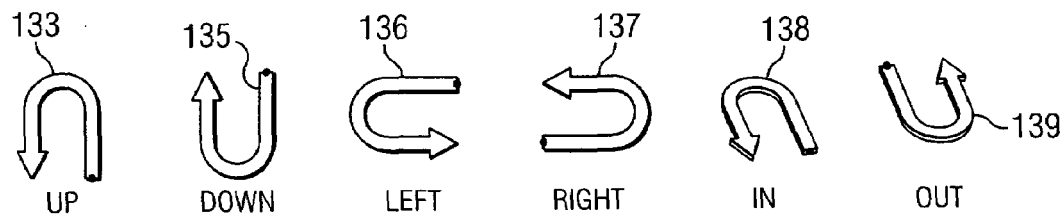
FIG. 11 illustrates an example of map navigation using motion input, in accordance with a particular embodiment.

FIG. 11 illustrates another example of map navigation using motion input, in accordance with a particular embodiment of the present invention. FIG. 11 includes a virtual desktop 140 representing an information grid divided into sixteen portions, each referenced by a respective letter (A, B, C, . . . P). Portions of virtual desktop 140 are identified using reference letters only for purposes of describing particular embodiments, and portions of virtual desktops in accordance with other embodiments may or may not be identified in a device application by a reference character or otherwise. Virtual desktop 140 includes more information that can be displayed at a particular handheld device at one time. Virtual desktop 140 may represent any suitable information through which a user may desire to navigate using a handheld device, such as a street map. A user may desire to navigate across virtual desktop 140 to display different portions of information on the handheld device display and may also desire to zoom in (and out of) virtual desktop 140 (i.e., change the granularity of the information displayed) to more clearly view certain portions of the information of virtual desktop 140.

In the illustrated example, box 142 represents information currently displayed at handheld device 10. Box 142 includes portions A, B, E and F of virtual desktop 140. In particular embodiments, if a user desires to change the information of desktop 140 displayed at the device to, for example, information of boxes C, D, G and H, then the user can use motion input to move box 142 representing the display of the device to the right the necessary amount (two portions to the right in the illustrated example). Such motion input may comprise translation input (moving the handheld device 10 to the right an applicable amount to change the information displayed) or a gesture input (moving the handheld device 10 according to a particular gesture mapped to this function). As an example, one gesture may be mapped to moving the display one portion to the right, while another gesture may be mapped to moving the display two portions to the right. Thus, using translation input or gesture input, the user may navigate across desktop 140.

The handheld device 10 may also allow the user to zoom in on certain information displayed for a clearer view of such information, for example, through translation input or gesture input. As an example using gesture input, if the information displayed at the device included four of the sixteen portions (e.g., box 142 displaying portions A, D, E and F), then a user may use one of four gestures, each mapped to zoom in on a particular portion, to zoom in on one of the four displayed portions. If the user moved the handheld device according to the gesture mapped to zoom in on portion B, then the device may display information represented by box 144 (portions B1, B2, B3, B4, B5, B6, B7, B8 and B9) collectively forming the information of portion B of virtual desktop 140 in an enlarged view. Thus, the information of portion B may be more largely and clearly displayed. When viewing the information of box 144 on the device, the user may zoom out or zoom in again on a particular portion currently displayed using appropriately mapped gestures. If the user moved the handheld device according to a gesture mapped as zooming in on portion B2 (this could be the same gesture as that used to zoom in on portion B when information of box 142 was displayed), then the device may display information of box 146 (portions B2a, B2b, B2c, B2d, B2e, B2f, B2g, B2h and B2i). The user may also be able to navigate across the virtual desktop when zoomed in on a particular portion. For example, when zoomed in on portion B (viewing information of box 144), the user may use translation or gesture input to move across the virtual desktop to view enlarged views of portions other than portion B. As an example, when viewing information of box 144 the user may make a gesture that moves the information displayed to the right such that the entire display shows only information of portion C of virtual desktop 140 (i.e., zoomed in on portion C showing portions C1, C2, C3, C4, C5, C6, C7, C8 and C9). It should be understood that a user may navigate through the information of virtual desktop 140 (both navigating across and zooming in and out) in any suitable manner using motion input.

As indicated above, any suitable gestures may be used to both navigate across a virtual desktop (or across a particular level) and to navigate between or through different levels or dimensions of a multidimensional desktop. Moreover, in some embodiments motion, such as gestures, may be used to navigate across the multidimensional desktop, and non-motion actions may be used to select or navigate between dimensions. Such non-motion actions may include the pressing of a key in a device input. Thus, a combination of motion and non-motion actions may be used for multidimensional virtual desktop or menu navigation in particular embodiments.

Particular embodiments may allow gesture-based navigation through any suitable application, such as a multidimensional grid, menu, calendar or other hierarchical application. For example, in a calendar application certain gestures may be used to navigate within one level, such as months, while other gestures may be used to navigate between levels, such as between years, months, days, hours and events. Moreover, different applications implemented in the handheld device that use such gesture navigation may use different gestures. Thus, the particular navigation gestures may change according to the particular application in use. In some embodiments, translation-based interfaces may be used to navigation through multidimensional information of a virtual desktop, as opposed to merely using gesture-based movements. For example, movement along x and y-axes may be used to travel within a level of a hierarchy, while movement along a z-axis may be used to travel between levels of the hierarchy.

Another example might involve using a telephone directory with institutions, letters of the alphabet, names, contact details (e.g., office, cellular and home phone numbers, email) and action to initiate contact all along different levels of a hierarchy. In this example, the hierarchy may contain information (nouns) and actions (verbs). One could map this example onto only two axes with, for example, a y-axis being used to select within a level of hierarchy and an x-axis being used to move between levels. A z-axis could be used to confirm the actions and help prevent inadvertent execution of actions.

In some cases, the number of levels traversed may depend on the magnitude of the motion, particular in translation-based navigation. Moving the device a small amount may navigate one level at a time, while moving the device a large amount may navigate multiple levels at a time. The greater the magnitude of motion, the more levels may be navigated at once. As applied to gesture-based motion inputs, different gestures may be used to navigate different numbers of levels in the hierarchy at once. These gestures may be different magnitudes of the same motion or entirely different motions.

The use of motion interface navigation through a multi-dimensional desktop or information display increases may allow menus to be flattened since a user may more easily navigate across a particular menu or dimension of a virtual desktop too large to fit on a device's display. As a result of the menu flattening, the user may be required to memorize less information thus increasing functionality and capability of the device for the user.

As discussed above, handheld devices in particular embodiments allow a user to navigate across a virtual desktop using motion input. In some cases, a user may utilize a cursor to navigate across information displayed at the handheld device. For example, certain information may be displayed at the device, and the user may utilize motion input to move the cursor around the device display and to select particular items displayed to perform certain functions. In some cases, motion input may be utilized to move a cursor, while a non-motion action (such as pressing a button) may be used to select an item currently indicated by the cursor. It should be understood that both gesture and translation motion input may be utilized in various embodiments of cursor navigation.

Figure 12A:
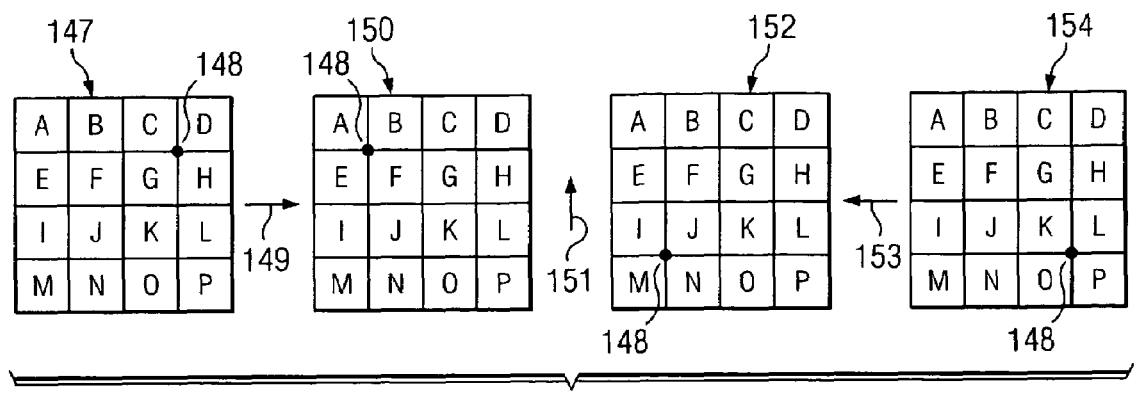
FIG. 12A illustrates a form of motion input cursor navigation, in accordance with a particular embodiment.

In particular embodiments, information displayed may be fixed with respect to the device, and the cursor may remain fixed in space such that movement of the device is used to navigate the cursor across the information. FIG. 12A illustrates an example utilizing this form of motion input cursor navigation. Display 147 represents a display of a handheld device. In order to describe this cursor navigation example, display has been divided into a grid to show information being displayed. The grid includes portions A-P. Display 147 includes a cursor 148 between portions C, D, G and H. As stated above, in this embodiment the information displayed remains fixed with respect to the device when the device is moved, and the cursor remains fixed in space. However, the cursor's position with respect to the information displayed changes according to motion input. When the device is translated to the right, according to right movement 149, the cursor is translated according to a motion opposite to the translation of the device.

Display 150 represents a possible display after the device is moved according to right movement 149, with cursor 148 now between portions A, B, E and F. It should be understood that since this example involves translation-based input, the magnitude of the movement of the device (e.g., to the right in this example) may directly affect the magnitude of the movement of the cursor with respect to the information displayed. Display 152 represents another display after the handheld device has been moved according to up movement 151, with cursor 148 now between portions I, J, M and N. As evident, the cursor will have moved down with respect to information displayed since it remains fixed in space. Display 154 represents another display after the handheld device has been moved according to left movement 153, with cursor 148 now between portions K, L, O and P. As evidence, the cursor will have moved to the right with respect to information displayed. Thus, in this form of cursor navigation, motion of the device changes the position of the cursor on the information. In this manner for example, the handheld device may be moved instead of using a stylus to point to certain portions of information displayed.

At any point in the cursor navigation process, a user may utilize any form of input (e.g., gesture, key press, etc.) to select or otherwise perform a function according to the information currently indicated at the cursor. For example, with respect to display 152, a user may use a particular gesture or press a button to zoom in, select or perform some other function based on information between portions I, J, M and N currently indicated by cursor 148.

As described above with respect to FIG. 12A, particular embodiments may translate the cursor in a motion opposite from the motion of the device to move the cursor across the information displayed. In one example of implementation, input motion of the device may be divided into motion along each of three axes, two of which are parallel to the device display (e.g., an x-axis and a y-axis). While motion of the device in the x-axis and y-axis plane changes information displayed at the device based on such motion, the cursor may be moved at the same time according to a translation vector that is opposite to the sum of movement in the x-axis direction and the y-axis direction to substantially maintain the position of the cursor in space. In some cases, when the cursor would move past a display edge off of the display according to the translation vector, the vector may be reduced in order to keep the cursor within the display. Such reduction may include reducing one or more components of the translation vector to maintain the cursor within a certain distance from the display edge.

It should be understood that the division of information displayed into portions A-P is done only for illustrating and describing the embodiments described above, and information displayed at handheld devices of particular embodiments may not include such a division or other type of reference information.

Figure 12B:
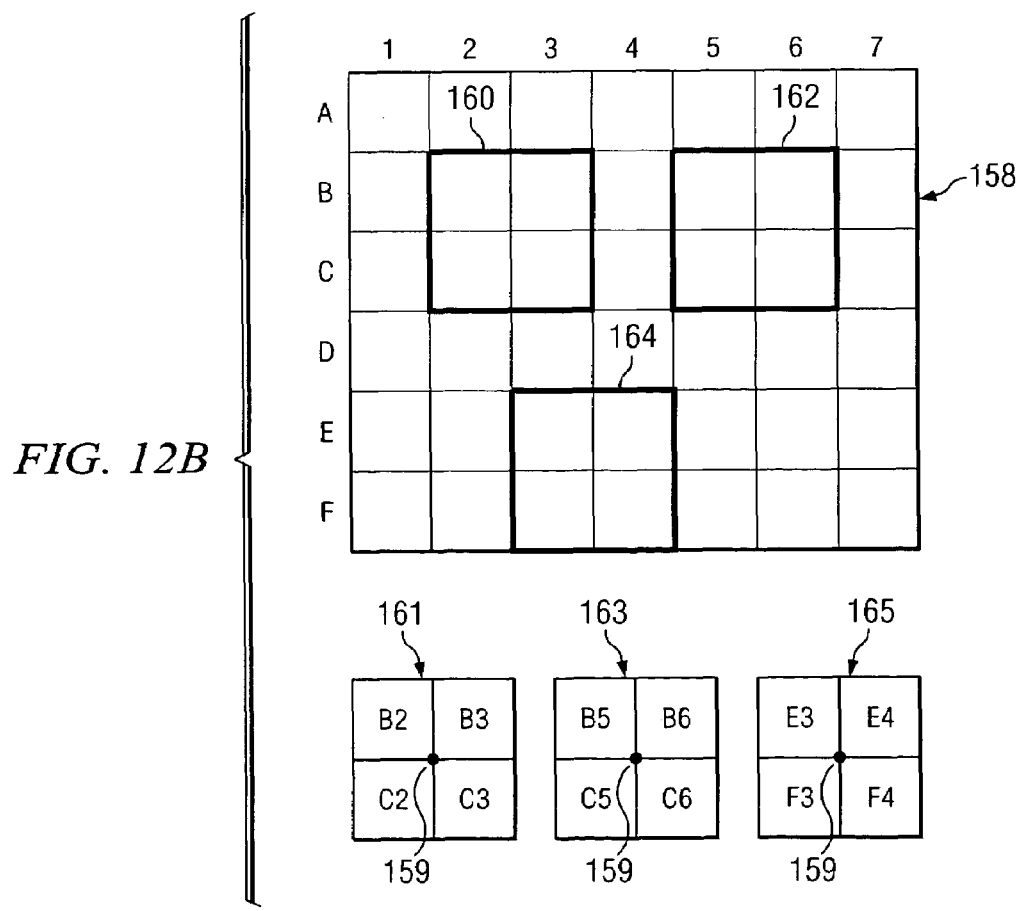
FIG. 12B illustrates another form of motion input cursor navigation, in accordance with a particular embodiment.

FIG. 12B illustrates another form of motion input cursor navigation, in accordance with a particular embodiment. In this example, the cursor remains in a fixed position with respect to the display while motion input is used to navigate across a virtual desktop larger than the device display. FIG. 12B includes virtual desktop 158 which comprises information through which a user may navigate using motion input at a handheld device, such as a street map. Virtual desktop 158 includes more information that can be displayed at a particular handheld device at one time. In order to describe this cursor navigation example, virtual desktop 158 has been divided into a grid to differentiate between information presented at the desktop. The grid includes 6 rows (A-F) and 7 columns (1-7). Portions of the grid may be identified herein for this example using their row letter and column number (e.g., portion B7 or D2). It should be understood that the division of virtual desktop 158 into portions referenced by row and column number is done only for illustrating and describing the embodiments described above, and the virtual desktops of particular embodiments may not include such a division or other type of reference information.

Box 160 represents information of virtual desktop 158 currently displayed at a handheld device. Display 161 represents the display of a handheld device showing information of box 160. Display 161 also includes a cursor 159 positioned at the intersection of portions B2, B3, C2 and C3. As indicated above, as a user utilizes motion input to move around the virtual desktop (i.e., to change the information displayed at the device), the cursor remains in a fixed position with respect to the display. However, the cursor's position changes with respect to the information of the virtual desktop displayed at the handheld device. For example, a user may utilize motion input to change the information displayed at the device to that represented at box 162. The information displayed at the device changes (to portions B5, B6, C5 and C6); and cursor 159 will remain fixed at the device display (e.g., in this case at the center of the display) such that its position changes with respect to the information of virtual desktop 158, as illustrated at display 163. If the user desired to use motion input to change the information displayed at the device to that represented at box 164, the information displayed at the device changes to portions E3, E4, F3 and F4, as illustrated at display 165. Cursor 159 is positioned between these illustrated portions in the center of the display since its position relative to the display remains fixed in this embodiment.

Thus, according to the form of cursor navigation illustrated with respect to FIG. 12B, the cursor will remain at a position fixed with respect to the device display, while its position with respect to the information of a virtual desktop changes. As discussed above with respect to the embodiment described and illustrated with respect to FIG. 12A, at any point in the navigation process, a user may utilize any form of input (e.g., gesture, key press, etc.) to select or otherwise perform a function according to the information currently indicated at the cursor. For example, with respect to display 163, a user may use a particular gesture or press a button to zoom in, select or perform some other function based on information between portions B5, B6, C5 and C6 currently indicated by cursor 159.

It should be understood that any particular input, such as a gesture or key press, may be used to switch cursor navigation modes at the device. For example, a user may switch between the translation-controlled cursor mode of FIG. 12A and the fixed cursor mode of FIG. 12B.

As discussed above, particular embodiments allow a user to move handheld device 10 according to a gesture to perform particular functions or operations. In some cases however, a user may not move the device according to the particular gesture intended, and the device may, as a result, not be able to recognize the movement as the intended gesture. In order to indicate that a particular movement of the device by a user is recognized as a particular gesture, handheld devices in some embodiments provide feedback to notify the user that the movement was in fact recognized as a gesture.

This feedback may comprise an audio format, such as speech, a beep, a tone or music, a visual format, such as an indication on the device display, a vibratory format or any other suitable feedback format. Audio feedback may be provided through a user interface speaker or headphone jack of device 10, and vibratory feedback may be provided through a user interface vibration generation module of device 10. Audio, visual and vibratory feedback may be varied to provide capability for multiple feedback indicators. As an example, vibratory feedback may be varied in duration, frequency and amplitude, singly or in different combinations over time. The richness and complexity of the feedback may be expanded by using feedback of different types in combination with one another, such as by using vibratory feedback in combination with audio feedback. In some cases, the feedback may be gesture-specific, such that one or more recognized gestures have their own respective feedback. For example, when a certain gesture is recognized the device may beep in a particular tone or a particular number of times, while when one or more other gestures are recognized the beep tones or number of beeps may change. The use of audio feedback may be especially valuable for gestures that do not have an immediately visible on-screen manifestation or function, such as calling a certain number with a cellular phone. Different types of feedback may also be context or application specific in some embodiments. Different contexts might include device state, such as what application is in focus or use, battery level, and available memory, as well as states defined by the user, such as quiet or silent mode. For example, a handheld device may utilize vibratory feedback in response to gesture input while in silent mode when audio feedback would otherwise be used. This feedback process may also be utilized by a handheld motion input device of a computer or other component.

Similar to the feedback relating to gesture recognition described above, handheld devices in particular embodiments may also provide feedback for the user in the event that a particular user movement was not recognized as a gesture when the device is in a gesture input mode. For example, if a motion appears intended to be a gesture, but cannot be assigned to a particular gesture that is known to the device, it may play a sound indicating failure. This notifies the user that the user must make another attempt at moving the device according to the intended gesture for the device to perform the operation or function desired. The feedback notifying the user that a movement was not recognized may also comprise an audio, visual, vibratory or other suitable format and may be a different feedback than that communicated when a particular movement is recognized by the device as a particular gesture. In order to determine whether a user's intent was to input a gesture, handheld device 10 may look at certain characteristics of the movement that imply that the motion was intended to be a gesture. Such characteristics may include, for example, the amplitude of the motion, the time course of the above-threshold motion and the number and spacing of accelerations. If a particular gesture is unrecognized by the device, a system of gestural feedback may be used to determine the gesture intended. For example, audio feedback may indicate possibilities determined by the handheld device, and the user may utilize gestures to navigate an auditory menu to select the intended gesture.

In particular embodiments, a system of audio or vibratory feedback may be used such that a user could operate handheld device 10 without having to resort to viewing display 12. For example, handheld devices in some embodiments may provide audio, visual or vibratory feedback to a user navigating a menu or other information of a virtual desktop. In effect, this device feedback combined with the motion input of a user could act as a type of "conversation" between the user and the device. As indicated above, multiple types and complexities of feedback may be utilized. The feedback process could be particularly advantageous in environments where it may be inconvenient, unsafe or impractical to look at the device display (e.g., while driving or while in a dark environment).

It should be understood that feedback, such as audio, visual and vibratory feedback, may also be used in some embodiments in connection with translation motion input. For example, a feedback indicator may be given when a user reached a limit or edge of a virtual desktop using translation input.

Figure 13:
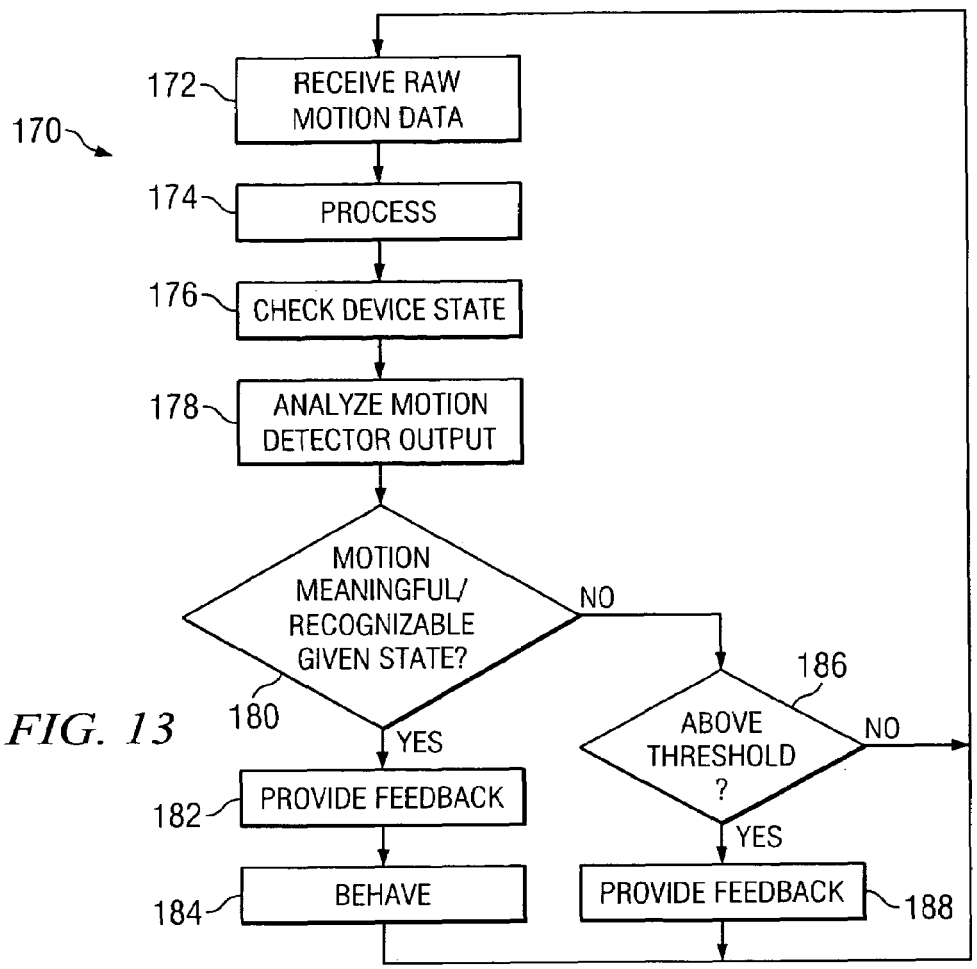
FIG. 13 is a flowchart illustrating a process for utilizing feedback in response to motion input, in accordance with a particular embodiment.

FIG. 13 is a flowchart 170 illustrating a process for utilizing feedback in response to motion input, in accordance with a particular embodiment. At step 172 of the process raw motion data is received at handheld device 10. As described above, the raw motion data may be received by any combination of accelerometers, gyros, cameras, rangefinders or any other suitable motion detection components. At step 174, the raw motion data is processed to produce a motion detector output indicative of the motion of the device. Such processing may include various filtering techniques and fusion of data from multiple detection components.

At step 176, the device state may be checked, because in some embodiments the feedback for a particular motion depends on the state of the device when the motion is received. As indicated above, example device states may include the particular application in focus or use, battery level, available memory and a particular mode, such as a silent mode. At step 178, the motion detector output is analyzed with respect to the device state. At step 180, it is determined whether the motion indicated by the motion detector output is meaningful or otherwise recognizable given the particular device state. For example, a particular gesture may perform a certain function in one application (e.g., a calendar application) while the gesture serves no function in another application. If the gesture is recognizable or meaningful give the state of the handheld device, then at step 182 feedback is provided. As indicated above, in particular embodiments feedback may be in an audio, visual or vibratory format. In some cases the feedback may merely be an indication that the device recognizes the gesture given the state of the device. In other cases, the feedback may be a further query for additional input, for example if the user was utilizing a particular application of the device that provided for a series of inputs to perform one or more functions. At step 184, the device behaves according to the motion input and device state, and the process may return to step 172 where additional raw motion data is received.

If it is determined at step 180 that the motion indicated by the motion detector output is not meaningful or recognizable given the particular device state, then the process proceeds to step 186. At step 186, it is determined whether the motion is above a particular threshold. This determination may be made to determine whether particular motion input was, for example, intended to be a gesture. As indicated above, threshold characteristics for this determination may include the amplitude of the motion input, the time course of the motion input and the number and spacing of accelerations of the motion. If it is determined that the motion input was not above a particular threshold, then the process may return to step 172 where additional raw motion data is received. If, however, the motion input was above a threshold such that a gesture may have been intended but was not recognized or meaningful given the device state, feedback is provided at step 188. The feedback may include audio, visual and/or vibratory feedback and may indicate that the gesture was not recognizable or meaningful. In particular embodiments, the feedback may also provide a query regarding the intended gesture or may otherwise provide the user with a number of potentially intended gestures from which the user may select the particular gesture intended by the motion. It should be understood that particular embodiments may not include some of the steps described (e.g., some embodiments may not include the threshold determination of step 186), while other embodiments may include additional steps or the same steps in a different order. As suggested above, particular embodiments may utilize motion input feedback (e.g., including feedback "conversations") in any of a number of applications and ways and the type and complexity of feedback systems may vary greatly in different embodiments.

As indicated above, handheld devices according to particular embodiments may receive gesture motion input to control any number of functions of any number of applications running at the device. Some applications that utilize gesture involve may comprise mobile commerce (mCommerce) applications in which a mobile device, such as handheld device 10, is used to conduct various transactions, such as commercial or consumer purchases. Many mCommerce applications utilize some form of authentication to authenticate a user, such as personal identification numbers (PINs), credit card information and/or possession of the mobile device. However, many forms of authentication can be "leaked." They can be shared intentionally or inadvertently. Another form of authentication is a user's written signature, which does not suffer from such leaking problems since forgery is typically difficult to accomplish and may be easy to detect. Particular embodiments may utilize motion input to receive a user's signature as a form of authentication in mCommerce or other transactions through the handheld device.

A written signature may be considered a two dimensional record of a gesture. When utilizing a handheld device with motion input, a user's signature may be in three dimensions and may thus comprise a "spatial signature." Moreover, when combined with other forms of input received at the device, a user's signature can take on any number of dimensions (e.g., four, five or even more dimensions). For example, a three-dimensional gesture "written" in space using the device and detected at motion detector 22 may be combined with key-presses or other inputs to increase the number of dimensions of the signature.

These spatial signatures can be tracked, recorded, and analyzed by motion detectors 22 of handheld devices. They can be recorded with varying degrees of precision with varying numbers of motion detector components to serve as an effective form of authentication. A user's spatial signature may take comprise a three-dimensional form based on the user's traditional two-dimensional written signature or may comprise any other suitable gesture which the user records at the handheld device as his or her signature.

In some embodiments, the process for recognizing a spatial signature may involve pattern recognition and learning algorithms. The process may analyze relative timings of key accelerations associated with the signature. These may correspond to starts and stops of motions, curves in motions and other motion characteristics. In some cases, some hash of a data set of a points of a signature motion may be stored, and subsequent signatures may be compared against the hash for recognition. This may further verify if the signature was genuine by determining whether it was unique. For example, in particular embodiments, a signature may be detected (e.g., by a signature detection module of device 10) by comparing a particular movement of the device with respect to an initial or reference position. Such comparison may be made by comparing a sequence of accelerations of the movement with a predetermined sequence of accelerations of a stored spatial signature. This determination may be made regardless of the scale of the user's input motion signature.

In some embodiments, the device can detect whether motion of the device matches the signature by determining whether positions of the device in motion relative to an initial position match the spatial signature.

Figure 14:
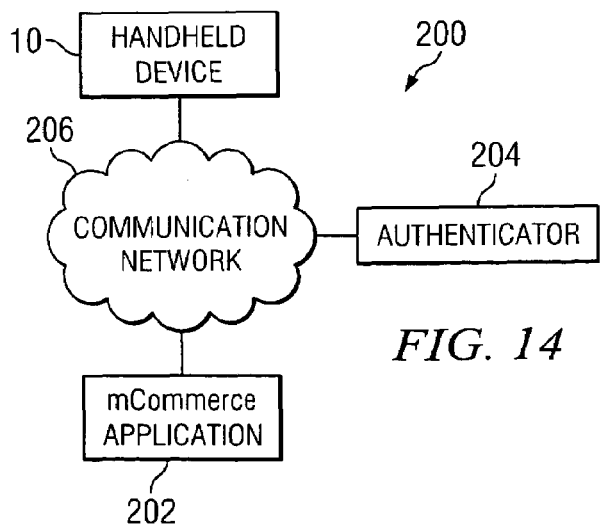
FIG. 14 illustrates an example system utilizing spatial signatures with a handheld device, in accordance with a particular embodiment.

FIG. 14 illustrates an example system 200 utilizing spatial signatures as authentication for mCommerce transactions. System 200 includes handheld device 10, mCommerce application 202, authenticator 204 and communication network 206. mCommerce application 202 may comprise any suitable application for transacting business with a handheld device of a user. Such transactions may include consumer purchases, such as products or services of a business or other user from a website, online bill paying, account management or any other commercial transaction. Authenticator 204 authenticates, or verifies, a spatial signature input by the user at handheld device 10 to complete an mCommerce transaction. Authenticator 204 may store one or more spatial signatures of one or more users for authentication in an mCommerce transaction. In some embodiments, authenticator may be located within handheld device 10, within mCommerce application 202 or at any other suitable location. Communication network 206 is capable of transmitting information or data between components of system 200 and may include one or more wide area networks (WANs), public switched telephone networks (PSTNs), local area networks (LANs), the Internet and/or global distributed networks such as intranets, extranets or other form of wireless or wireline communication networks. Communication network 206 may include any suitable combination of routers, hubs, switches, gateways or other hardware, software or embedded logic implementing any number of communication protocols that allow for the exchange of information or data in system 200.

In operation, when a user utilizes handheld device 10 to conduct a transaction with mCommerce application 202, the user may utilize motion input to communicate an authentication signature, for example by moving the device according to the user's three-dimensional signature. As an example, a user might use their cellular phone at a point-of purchase (e.g., store) instead of a credit card. Instead of signing a paper document that then needs to be shipped and processed, the user could simply move device 10 according to the user's spatial signature. As indicated above, the user's signature may include more than three dimensions in some embodiments. The signature may have been previously recorded by the user using handheld device 10 or another mobile device, and the recorded signature may be stored at handheld device 10, mCommerce application 202, authenticator 204 or other suitable location such as a signature storage database for signatures of multiple mCommerce users.

The motion of handheld device 10 may be processed at the device, and motion output indicative of the motion may be transmitted to mCommerce application 202. mCommerce application 202 may communicate the motion output to authenticator 204 for verification that the motion input received at device 10 was in fact the signature of the user attempting to transact mCommerce. If authenticator 204 verifies the user's signature, then mCommerce application may complete the transaction with the user. As indicated above, authenticator 204 may be located within handheld device 10 or at mCommerce application 202 in particular embodiments and may access signatures for verification stored at device 10, mCommerce application 202 or any other suitable location.

Authentication may also be used by handheld devices in a non-mCommerce application, for example when electronic security is desired to perform functions such as sending private or secure data using the device. A user desiring to transmit data or other information using handheld device 10 may use their spatial signature in the encryption process. Spatial signatures may be used in any of a variety of ways to secure data for communication through a network and may be utilized in connection with public/private key encryption systems. For example, in some embodiments handheld device 10 may authenticate a user's signature received through motion input and then use its own private key to encrypt data for transmission. In other cases, data may be communicated to handheld device 10 such that an intended recipient must input their spatial signature to receive the decrypted data. In some embodiments, data may be communicated to a computer witlessly connected to handheld device 10, and the intended recipient must use handheld device 10 as a way to communicate the user's signature to the computer for data decryption. Moreover, in particular embodiments, a user's spatial signature itself may represent an encryption key such that motion of the device generates the encryption key instead of the signature motion merely being used for authentication. In some cases a device may recognize a combination of accelerations as a signature by converting the signature into the equivalent of a private key. The handheld device may then use the private key as part of an authentication process for a transaction.

In particular embodiments, a spatial signature may be used to manage physical access to a building or event. For example, the signature input by a user at a device may be checked against a list of people allowed to enter as IDs are checked at "will call" for an event.

In particular embodiments, a user may utilize motion input for handheld device 10 to control other devices, such as audio/video equipment, home appliances and devices, computing devices or any other device capable of being controlled by a handheld device. Devices may be controlled by handheld device 10 through communications interface 20 of device 10 utilizing any of a number of wireless or wireline protocols, including cellular, Bluetooth and 802.11 protocols. In some embodiments, device 10 may receive motion input to control, through wireless or wireline communication, other devices through a network. Thus, devices controlled through motion input of device 10 may be at any location with respect to device 10, such as in the same room or across a country. Moreover, control of the other device may be implemented through any number of intermediate devices (e.g., through a network).

As an example, if handheld 10 device were a Bluetooth-enabled cellular phone, then particular gestures or other motion of the cellular phone may witlessly communicate commands to control another device, such as a laptop across a room to drive a PowerPoint presentation. Other devices which may be controlled through motion input of handheld device 10 may include televisions, radios, stereo equipment, satellite receivers, cable boxes, DVD players, digital video recorders, lights, air conditioners, heaters, thermostats, security systems, kitchen appliances (e.g., ovens, refrigerators, freezers, microwaves, coffee makers, bread makers, toasters), PDAs, desktop and laptop PCs, computer peripheral equipment, projectors, radio controlled cars, boats and planes and any other device. As another example, a commuter may shake their cellular phone in a certain manner to tell their heater at home to turn on before the commuter arrives at home. In some embodiments, a handheld device may receive and process raw motion data to determine commands or intended functions for communication to other devices. In other embodiments, a motion detector of a handheld device may output raw data received from its motion detection components for communication to one or more devices controlled by device 10 through the motion of device 10. As a result, different devices controlled by device 10 may treat the same raw motion data of device 10 differently. For example, a particular gesture of device 10 may perform different functions of different devices controlled by device 10.

Figure 15:
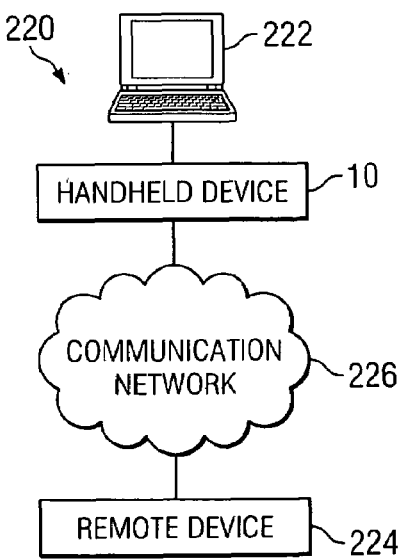
FIG. 15 illustrates an example system in which motion input of a handheld device controls multiple other devices, in accordance with a particular embodiment.

FIG. 15 illustrates an example system 220 in which handheld device 10 controls multiple other devices through motion input of device 10. System 220 includes handheld device 10, laptop 222 and remote device 224 connected, through wireless or wireline links, to handheld device 10 through communication network 226. Handheld device 10 receives raw motion data of a particular motion of the device through motion detection components, such as accelerometers, cameras, rangefinders and/or gyros. The raw motion data is processed at the handheld device. Particular databases, such as gesture and gesture mapping databases, may be accessed to determine a matching gesture and intended function based on motion tracked by a control module of the device. The intended function may be for another device to be controlled by handheld device 10, such as laptop 222 or remote device 224. Thus, the motion input is the interface for the underlying operational signal communicated from device 10 to the controlled device. In other embodiments, the raw motion data or other data merely indicating a particular motion input for device 10 may be directly sent to laptop 222 and/or remote device 224 without determining a function at device 10. In these embodiments, laptop 222 and/or remote device 224 may themselves process the raw motion data received from handheld device 10 to determine one or more intended functions or operations they should perform based on the raw motion data. In some embodiments, a user of device 10 may indicate to device 10 through motion or otherwise the other devices that handheld device 10 should communicate raw motion data or intended functions of such other devices, as applicable. While two devices controlled by handheld device 10 are illustrated, it should be understood that particular embodiments may include any number of devices of varying types to be controlled by handheld device 10 through motion input as discussed above.

As indicated above, particular embodiments include the ability to control other devices, such as other local or remote devices, through motion input of handheld device 10. In some embodiments a user of handheld device 10 selects the other device that a particular motion input of device 10 is intended to control. For example, a user may use input 14 of handheld device 10 (e.g., by pressing a button or moving a trackwheel) to select a local or remote device to control before moving device 10 according to a particular motion mapped to a function or operation desired for the other device. In particular embodiments however, a user may move handheld device 10 according to a particular gesture in order to select the other device (e.g., other local or remote device) to be controlled at the time through motion input of device 10. Thus, particular embodiments provide gesture motion selection of other devices to be controlled by handheld device 10.

Handheld device 10 may include a device selection module operable to detect a device selection gesture which indicates that a user desires to control a particular device. Each controllable device may include its own gesture command maps which correlate gestures to be input using device 10 and commands of the controllable device. A control module of the handheld device may select a particular command map corresponding to the controllable device selected for control. In some embodiments, device 10 may include a device locator operable to detect, for each of a plurality of remote devices, a direction from the handheld device to each remote device. In this case, the user may move handheld device 10 in the direction of a particular remote device the user desires to control in order to select that remote device for control.

While motion input for device 10 may be used for such control of the other devices, other types of input (e.g., utilizing input 14) may also be used to control other local or remote devices selected for control by gesture input. In some embodiments different gestures may be each mapped to control a different device. In other embodiments, device 10 may display possible other devices for control and particular gesture(s) to utilize to indicate a user's selection as to which other device the user desires to presently control through device 10. Handheld devices according to the present invention may utilize any particular manner of gesture selection of one or more local or remote devices to be controlled by the handheld devices.

As discussed above, particular embodiments include handheld devices 10 capable of detecting motion of the device through a motion detector 22 to modify the behavior of the device in some way according to the motion detected. Handheld devices 10 in some embodiments are capable of modeling their particular environment and subsequently modifying their behavior based on such environment. One distinction between modeling an environment of a handheld device and detecting a particular motion of the device is that in the former case there may be reasoning involved and in the latter case there may be no such reasoning. As an example, if a handheld device changes its behavior when moved according to a particular gesture, that may be considered sensing or detecting a particular motion and reacting based on the motion detected. If, on the other hand, the handheld device determines that it is sitting face down on a table and reacts accordingly, that may be considered modeling its environment. As another example, if a handheld device moves to the left and changes its behavior based on such movement, that may be considered detecting motion and reacting. If the handheld device finds itself in free fall and powers-down so as to survive an impending collision with the ground, that may be considered modeling its environment. A further distinction may be that environmental modeling may not require an immediate response to a user input, while detecting an event, such as a particular motion, generally does require such an immediate response. Modeling an environment may thus involve sensing or detecting a pattern of motion (or lack thereof), matching it to a predefined set of environmental conditions and modifying the behavior of the device based on the modeled environment. The behavior implemented based on the environment modeled may also change based on a particular application in use or in focus. In some cases, the device may change its sensitivity to particular motions based on the environment modeled.

As an example, a handheld device may recognize, through accelerometers or other motion detection components, that it is at rest on an approximately horizontal surface. Such recognition may result from a determination that the device is not moving, or still, with a static 1 g of acceleration orthogonal to a surface. The device may be able to differentiate resting on a table from resting in a user's hand, for example, because a user's hand typically will not be able to hold the device perfectly still. The device may, as a result, behave in a certain manner according to the recognition that it is at rest on an approximately horizontal surface. For example, if handheld device 10 recognized that it was lying at rest on a table, it may power off after lying in such position for a certain amount of time. As another example, a cellular phone in a vibrate mode may vibrate more gently if it recognizes it is on a table upon receipt of a call or upon any other event that may trigger vibration of the phone. In some embodiments, the device may recognize its orientation while lying on a table such that it may behave in one manner when lying in a "face down" position (e.g., it may power off) while it may behave in a different manner when lying in a non-face down position. If handheld device 10 comprised a cellular phone, it may enter a speaker mode when it is on a call and recognizes that it is placed by a user in a "face up" position on a table while on the call. If, on the other hand, the cellular phone is on a call and is placed face down on the table, it may enter a mute mode.

As another example, handheld device 10 may recognize through a brief period of approximately 0 g that it is in free-fall and then may behave to reduce damage due to impending impact with the ground or another surface. Such behavior may include, for example, powering down chips and/or hard drives, retracting lenses, applying covers or any other device behavior. In particular embodiments, non-handheld devices or devices that do not otherwise detect motion for input may also be able to model their environment and to behave based on the environment modeled. As an additional example, acceleration patterns may be detected to recognize that a handheld device 10 is in a moving environment (e.g., being held by a user in a car or on a train) and may adjust various sensitivities, threshold and/or other characteristics to enable better performance of the device in that environment.

In other embodiments, handheld device 10 may comprise a digital camera. Through its motion detection components, the camera may determine whether it is on a tripod or is being held by a user when a picture is taken. The camera may set a shutter speed for the picture based on that determination (e.g., slow shutter speed if on a tripod or fast shutter speed if being held by a user).

If handheld device 10 comprised a device that utilized a cradle for syncing up with another device, such as a PC, then device 10 may recognize that it is in the cradle based on its stillness (or supported state) and its particular orientation. The device may then operate or function according to its state of being in the cradle (e.g., it may then sync up with its associated PC).

Figure 16:
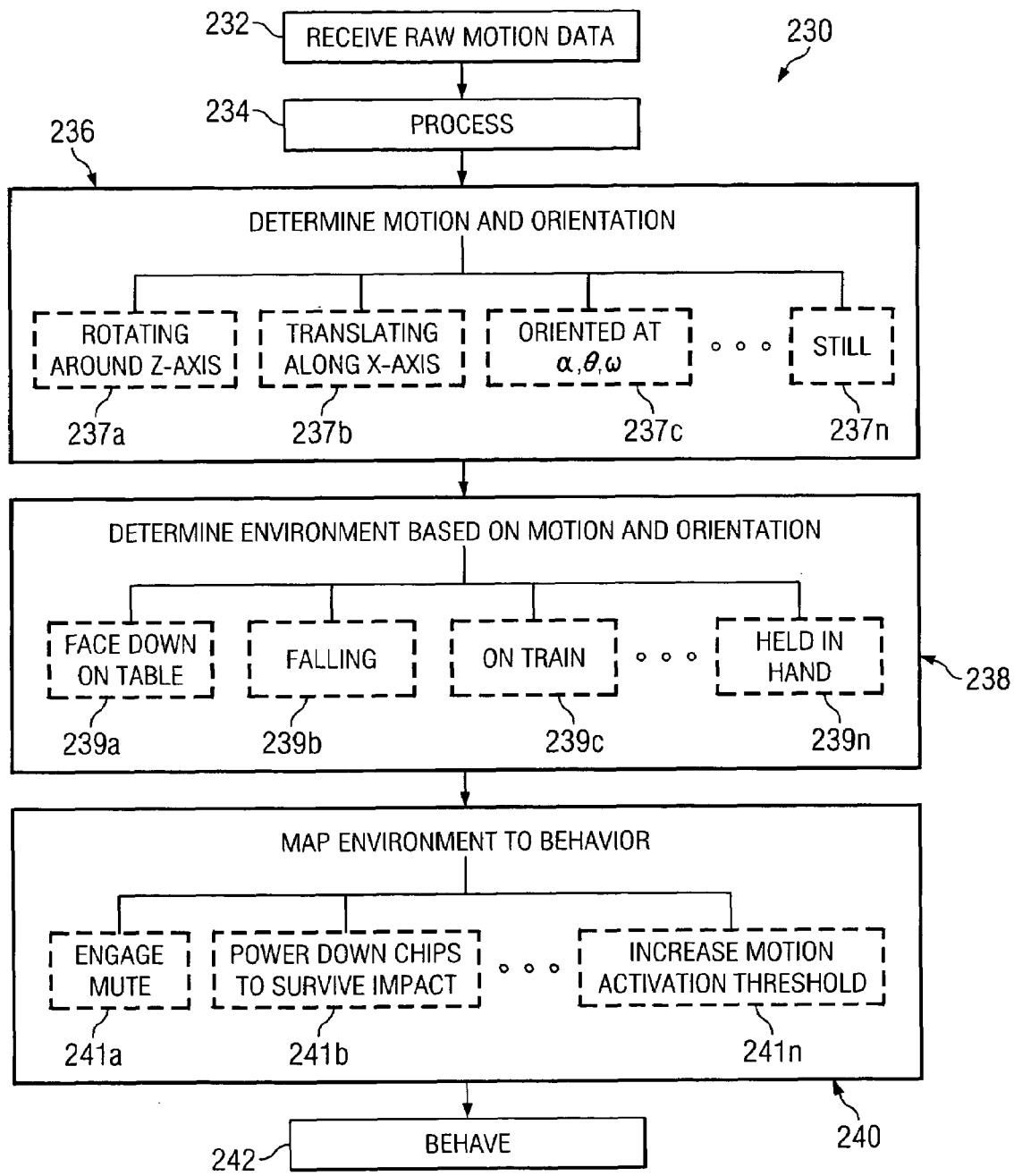
FIG. 16 is a flowchart illustrating an environmental modeling process of a handheld device, in accordance with a particular embodiment.

FIG. 16 is a flowchart 230 illustrating an environmental modeling process, in accordance with a particular embodiment. At step 232, raw motion data is received at handheld device 10. As described above, the raw motion data may be received by any combination of accelerometers, gyros, cameras, rangefinders or any other suitable motion detection components. At step 234, the raw motion data is processed to produce a motion detector output from which motion and orientation of the device is determined at step 236. Boxes 237 represent example motions and orientations of the device, such as rotating around the z-axis in box 237a, translating along the x-axis in box 237b, oriented at particular angles α, θ, ω in box 237c and still in box 237n. These are mere example motions and orientations of the device, and any number of motions may be utilized that are determined at step 236. In some embodiments, the determined orientations may comprise an orientation of the device with respect to gravity.

At step 238, handheld device 10 determines its environment based on the motion and orientation determined at step 236. Boxes 239 represent example environments of the device, such as face down on a table in box 239a, falling in box 239b, on a train in box 239c and held in hand at box 239n. Any number of environments may be determined based on motions and orientations determined at step 236. In particular embodiments, the environmental determination may also be based on a history of the device, such as a motion/orientation history. For example, when implementing a speaker mode function of a cellular phone, the device may detect a quite period when horizontal in the middle of a call after a short jarring is detected (e.g., the short jarring caused by a user placing the phone face up on a table). The phone can detect that it was jarred so that stillness and a perpendicular position relative to gravity may take on a different meaning than had the jarring not occurred. Thus, the determination of the environment may be based on the motion and orientation of the device and its history. The history may comprise a previous motion/orientation of the device or any other information relating to a device's history.

At step 240, the determined environment is mapped to a particular behavior. The mapped behavior may depend on any number of factors in addition to the determined environment, such as desired characteristics of the particular user using the device at the time or the particular application in use or focus at the time. For example, the behavior according to a particular modeled environment may include engaging a mute function of the handheld device in box 241a, powering down chips of the device to survive an impact in box 241b and increasing a motion activation threshold of the device in box 241n. The mute behavior indicated in box 241a may be implemented when a cell phone's environment comprises laying face down on a table while on a call. The powering down chips behavior in box 241b may be implemented when the environment of handheld device 10 comprises a free fall of the device. The increasing a motion activation threshold behavior of box 241n may be implemented when a handheld device's environment comprises being in a car or train where bumpiness may require a greater movement threshold for a user's motion input to register as an intended input. Particular embodiments may include any number of behaviors mapped to one or more modeled environments. At step 242, the handheld device behaves according to the behavior to which its environment is mapped at step 240.

As indicated above, users may move handheld devices according to particular gestures to cause the devices to perform desired functions, operations or tasks. In particular embodiments, gestures used as motion input for the device may comprise pre-existing symbols, such as letters of the alphabet, picture symbols or any other alphanumeric character or pictographic symbol or representation. For example, gestures used as motion input may mimic upper and lower case members of an alphabet in any language, Arabic and Roman numerals and shorthand symbols. Preexisting gestures may be used for handheld input devices for other local and remote devices as well. Using preexisting gestures for handheld device input may facilitate the learning process for users with respect to gesture motion interfaces.

FIG. 17 illustrates example gestures which may be mapped to particular functions. For example, if handheld device 10 comprised a cellular phone, a user may move device 10 in the form of heart 250 to call the user's girlfriend, boyfriend or spouse or house 252 to call the user's home. As another example, if handheld device 10 were a PDA or other device running an application managing files or data, moving the device in the form of C-gesture 254 may be a command for copying data, O-gesture 256 may be a command for opening a file, D-gesture 258 may be a command for deleting data and X-gesture 260 may be an exit command for a file or application. The logical connection between gestures and their intended functions or operations (e.g., "O" for opening a file) further facilitates user interaction and learning.

Any number of pre-existing symbols may be used as gestures for motion input as commands for performing any number of functions, operations or tasks of a handheld device. Many preexisting gestures typically exist in two dimensions. Handheld device 10 may recognize such gestures. In some cases, for example, handheld device 10 may disable receipt of a particular dimension so that any movement in a third dimension when a user is attempting to input a two-dimensional gesture is not received or detected in order to facilitate recognition of the two-dimensional gesture. In some embodiments, handheld device 10 may receive three-dimensional gestures that may be based on preexisting two-dimensional gestures. Receiving and detecting three-dimensional gestures increases the capabilities of the device by, for example, increasing the number and types of gestures which may be used as motion input.

FIG. 18 is a flowchart 270 illustrating the utilization of a preexisting symbol gesture, the letter "O," as motion input. As illustrated in step 272, a user moves handheld device 10 in the form of the letter "O." At step 274, handheld device 10 receives raw motion data of the "O" movement from motion detection components and process such raw motion data at step 276 to determine the actual motion of the device. At step 278, handheld device 10 accesses a gesture database 280 which may include a plurality of gestures recognizable by the device to map the motion to the gesture "O." The plurality of gestures of the gesture database may each be defined by a series of accelerations of a movement. The actual motion of the device may be matched to a series of accelerations of one of the gestures of the gesture database. At step 282, handheld device 10 maps the gesture "O" to a particular function by accessing a function database 284 (or a gesture mapping database) which may include a plurality of functions that may be performed by one or more applications running on the device. In particular embodiments, the gesture and function databases may be comprised in memory 18 of the device. The particular function mapped to the gesture "O" may depend on a particular application in focus or being used by the user at the time. For example, in some applications "O" be comprise a command to open a file, while in other applications it may comprise a command to call a certain number. In some cases, one gesture may be mapped to the same function for all applications of the device. At step 286, the device behaves according to the mapped function, such as opening a file.

As indicated above, gestures used as motion input for handheld device 10 may have different meanings (e.g., functions, operations, tasks) based on a particular context, such as a particular application in use or in focus, a particular device state with respect to an application or otherwise, a particular modeled environment or any combination of these or any other context. For example, a particular gesture may be mapped as a command to scroll a page up when running a web browser at the device, while the gesture may be mapped as a command to examine a different date when running a calendar program. The ability for particular gestures to be mapped to different commands depending on the context, such as the application in use, increases the functionality of the device.

Handheld devices in some embodiments may be able to utilize simpler motion detection components if gestures are mapped to different commands depending on the context. As an example, a handheld device may include particular motion detection components such that the handheld device may only be able to recognize and distinguish between twenty different gestures. If each gesture is mapped to a different function for each of four different applications, then the ability to only recognize twenty unique gestures still provides eighty different functions on the device (twenty for each application). If each gesture were mapped to its own function, no matter what application was in focus; then the overall capability of the device would be reduced, and some gestures would likely not be used in some applications. The ability to use less complex components that are able to recognize and distinguish between fewer gestures as a result of mapping gestures to a plurality of functions depending on the context can lead to reduced costs in the components utilized in the device and can also simplify the task of physically learning gestures required to control the device. As indicated above, gestures may be mapped to different functions, operations or tasks depending on the application in use, device state, modeled environment or other context. In some cases, gestures may be mapped to different functions depending on the state of a particular application. For example, in the case of a word processing program, some gestures may have some functions when in one state of the program (e.g., a menu state) while the same gestures may have different functions when in another state of the word processing program (e.g., a document editing state). In this case, a command map associated with the gesture function mappings may include gesture mappings for each such state.

Figure 19:
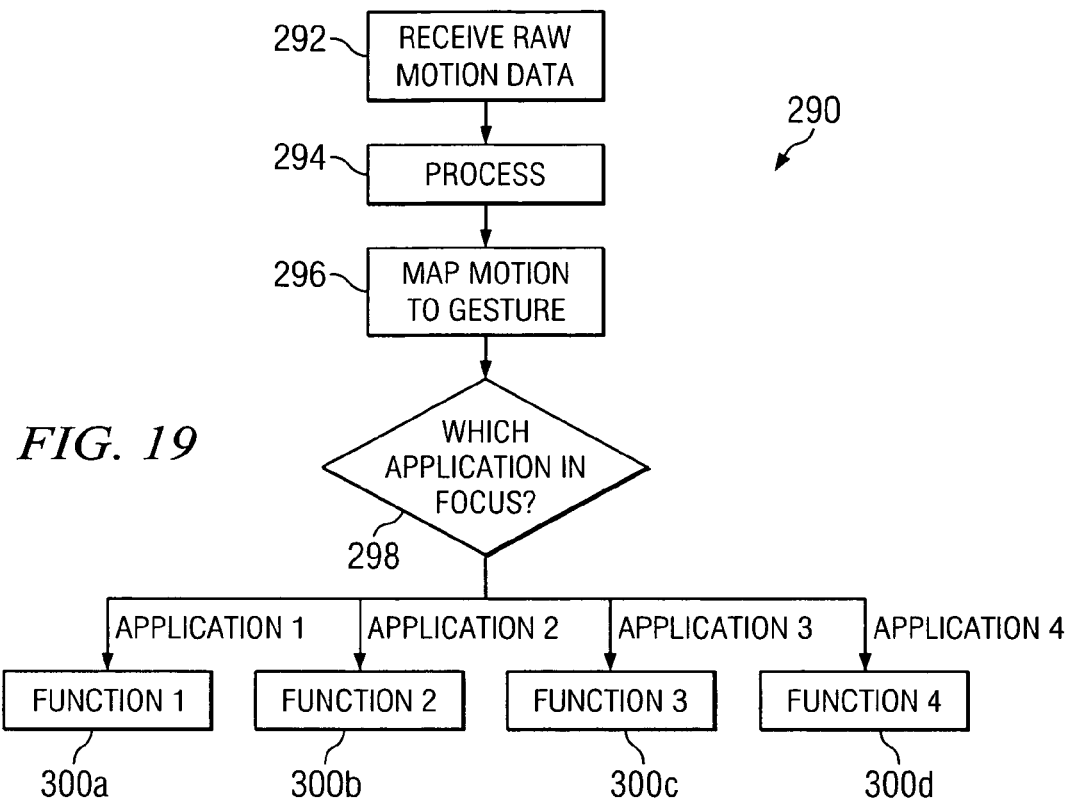
FIG. 19 is a flowchart illustrating the use of context-based gesture mapping, in accordance with a particular embodiment.

FIG. 19 is a flowchart 290 illustrating the use of context-based gesture mapping, in accordance with a particular embodiments. In the illustrated embodiment, a gesture has different functions assigned based on the application in focus. At step 292, handheld device 10 receives raw motion data of a particular gesture movement and process such raw motion data at step 294 to determine the actual motion of the device. At step 296, handheld device 10 maps the motion to a gesture, for example, by accessing a gesture database. At step 298, handheld device 10 determines which application is in focus. For example, if the device were capable of running four different applications, then it would determine which of the four was in focus or was being used at the time. The device then performs the function mapped to the gesture according to the application in focus. The identification of such function may be accomplished in some embodiments by accessing a function database which may also be referred to as a gesture mapping database since it correlates gestures of a gesture database to functions. In the illustrated embodiment, if Application 1 is in focus, then the device performs Function 1 at step 300*a*; if Application 2 is in focus, then the device performs Function 2 at step 300*b*; if Application 3 is in focus, then the device performs Function 3 at step 300*c*; and if Application 4 is in focus, then the device performs Function 4 at step 300*d*.

As a further example of context-based gesture mapping, a handheld device with phone and PDA capabilities may run four applications: a phone application, a calendar application, a file management application and an e-mail application. A gesture input mimicking the letter "S" may have different functions depending on, the application in focus. For example, if the phone application is in focus, then receiving the gesture input "S" may be a command for calling a particular number designated to the "S" gesture. If the calendar application is in focus, then receiving the gesture input "S" may be a command for scrolling to the month of September in the calendar. If the file management application is in focus, then receiving the gesture input "S" may be a command for saving a file. If the e-mail application is in focus, then receiving the gesture input "S" may be a command for sending an e-mail. Particular embodiments contemplate great flexibility in the ability to map gestures to different functions depending on the context.

As discussed above, gestures may have different functions depending on a particular context at the time. In particular embodiments, handheld devices may be customizable to allow users to assign device functions to pre-defined gestures. The functions may be context-based such that some gestures may have different functions depending on an application in use, a device state or a modeled environment. Handheld devices in some embodiments may allow different users of the same device to assign different functions to the same gesture, and such functions may also be context-based as discussed above.

For example, a handheld device 10 may be utilized by a number of different users at different times. Each user may assign different functions for the same gestures. When the handheld device receives a gesture input, it must thus know which user is using the device at the time to determine which function the user intends the device to perform. The device may determine the user in any of a variety of ways. In some embodiments, users may log into the device prior to use by using a username and password or otherwise. In other embodiments, the handheld device may be able to identify the user based on the manner in which the user moves the device for motion input, such as the way the user forms a gesture using the device. As indicated above, each user may also assign commands to gestures based on context, such as based on the application in focus at the device. The ability for the handheld device to map functions to gestures based on particular users further increases the device's capabilities and flexibility, particularly if the device is able to recognize and distinguish only a particular number of gestures.

Figure 20:
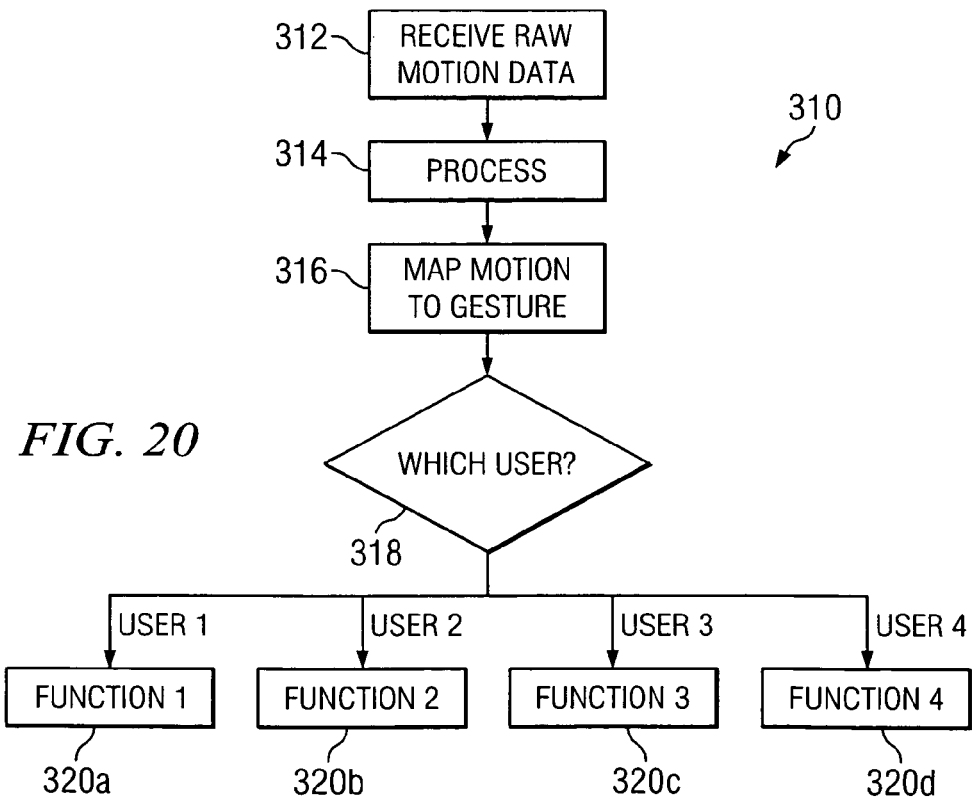
FIG. 20 is a flowchart illustrating the use of user-based gesture mapping, in accordance with a particular embodiment.

FIG. 20 is a flowchart 310 illustrating the use of user-based gesture mapping, in accordance with a particular embodiment. In the illustrated embodiment, a gesture has different functions assigned based on the user using the device. At step 312, handheld device 10 receives raw motion data of a particular gesture movement and process such raw motion data at step 314 to determine the actual motion of the device. At step 316, handheld device 10 maps the motion to a gesture, for example, by accessing a gesture database. At step 318, handheld device 10 determines which user is using the device. Such determination may be made, for example, through a log in system in which users log into the device prior to use. Handheld device 10 may determine the current user through other suitable methods as well. At steps 320, the device performs the functions assigned to the gesture input based on the user using the device. In the illustrated embodiment describing the process with four possible users, if User 1 is using the device, then the device performs Function 1 at step 320a; if User 2 is using the device, then the device performs Function 2 at step 320b; if User 3 is using the device, then the device performs Function 3 at step 320c; and if User 4 is using the device, then the device performs Function 4 at step 320d.

As indicated above, in some embodiments, gestures may be assigned different functions based on both users using the device and a context. In this situation, the illustrated flowchart 310 described above may have an additional step to determine the context at the time (e.g., step 298 of flowchart 290 determining the application in focus). The particular function desired for performance by a certain gesture thus depends on both the user using the device at the time and the context, such as the particular application in focus at the time.

As previously discussed, some embodiments include handheld devices with the ability to receive preexisting symbols as gestures for motion input. Some of those embodiments as well as other embodiments may include the ability for user's to create their own gestures for mapping to functions and/or keys. The gestures may comprise any user-created symbol or other motion that the user desires to utilize as motion input for one or more particular functions, operations or tasks that the device is able to perform. Users may be able to create motions with some personal significance so they may more easily remember the motion's command or intended function.

FIG. 21 is a flowchart 330 illustrating the assignment process for user-created gestures, in accordance with a particular embodiments. At step 332, an indication is received from a user for gesture creation. The indication may be received in any of a variety of ways using any suitable input format (e.g., keys, trackwheel, motion, etc.). The user may move the device according to the user-created gesture such that raw motion data for the user-created gesture is received at the handheld device at step 334. The raw motion data may comprise a sequence of accelerations of a movement after stabilization of the device from a base reference position until an indication is received to stop recording the reference positions. Indications to start and stop recording a user-created gesture may include motion or non-motion indications (e.g., key presses and key releases). The raw motion data is processed at step 336. At step 338, the motion is stored as a gesture, for example, at a gesture database. In particular embodiments, the indication for gesture creation may be received after the user moves the device according to the user-created gesture. For example, the user may move the device according to a user-created gesture that is currently unrecognizable by the device. The device may query the user to determine if the user desires to store the unrecognized gesture for a particular function. The user may respond in the affirmative so that the user may utilize the gesture as motion input in the future.

At step 340, function mapping information for the gesture is received from the user. The function mapping information may comprise functions, operations or tasks of the device that the user desires the user-created gesture to command. In particular embodiments, such function mapping information may comprise a series of functions (e.g., a macro) that one gesture may command. The user may assign different functions for a gesture according to an application in focus. In some cases, a user may desire to map different gestures to different keys or keystrokes of the device. One examples of mapping a series of functions to a gesture may include mapping a long string of characters to a gesture (e.g., telephone numbers including pauses, where appropriate). At step 342, the function mapping information is stored, for example, at a function database or gesture mapping database.

As indicated above, it may be difficult for a user to move handheld device 10 in the same precise manner for one or more gestures each time those gestures are used as input. Particular embodiments thus allow for varying levels of precision in gesture input. Precision describes how accurately a gesture must be executed in order to constitute a match to a gesture recognized by the device, such as a gesture included in a gesture database accessed by the device. The closer a user generated motion must match a gesture in a gesture database, the harder it will be to successfully execute such gesture motion. As discussed above, in particular embodiments movements may be matched to gestures of a gesture database by matching a detected series of accelerations of the movements to those of the gestures of the gesture database.

As the precision of gestures required for recognition increases, one may have more gestures (at the same level of complexity) that can be distinctly recognized. As an example, if the precision required was zero, then the device could only recognize a single gesture but it would recognize it easily because anything the user did would be recognized as that gesture. If, however, the precision required was infinite then it would be virtually impossible for a user to form a gesture that was recognized by the device, but the device could support an infinite number of gestures with only infinitesimal differences between them. One area in which the precision requirement is especially applicable is in the area of spatial signatures. With spatial signatures, the level of precision correlates well with the level of security.

In particular embodiments, the precision required by handheld device 10 for gesture input may be varied. Different levels of precision may be required for different users, different regions of the "gesture space" (e.g., similar gestures may need more precise execution for recognition while gestures that are very unique may not need as much precision in execution), different individual gestures, such as signatures, and different functions mapped to certain gestures (e.g., more critical functions may require greater precision for their respective gesture inputs to be recognized). Moreover, in some embodiments users may be able to set the level(s) of precision required for some or all gestures or gestures of one or more gesture spaces. As an example, a user may set the precision required for spatial signatures higher than for other gestures for the user thus increasing security for spatial signature input.

As indicated above, in particular embodiments gestures may be recognized by detecting a series of accelerations of the device as the device is moved along a path by a user according to an intended gesture. Recognition occurs when the series of accelerations is matched by the device to a gesture of a gesture database.

In some embodiments, each gesture recognizable by handheld device 10, or each gesture of a gesture database, includes a matrix of three-dimensional points. In addition, a user movement intended as a gesture input includes a matrix of three-dimensional points. Handheld device 10 may compare the matrix of the movement with the matrices of each recognizable gesture (or each gesture in the gesture database) to determine the intended gesture. If a user moves the device such that the movement's matrix correlates to each point of an intended gesture's matrix, then the user may be deemed to have input the intended gesture with perfect precision. As the precision required for gesture input is reduced, then the greater the allowable differences between a user gesture movement and an intended gesture of a gesture database for gesture recognition.

Figure 22:
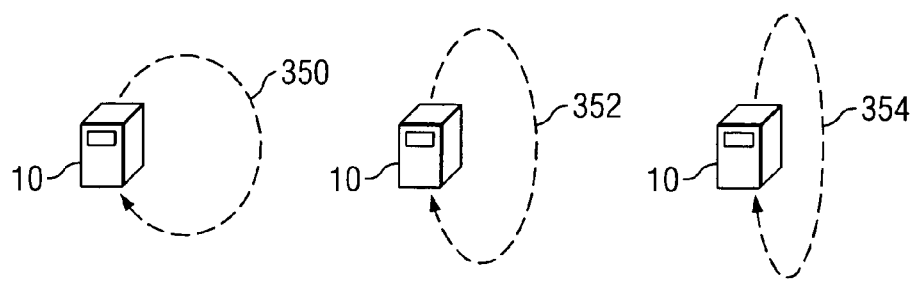
FIG. 22 illustrates three gestures input using a handheld device with varying levels of precision, in accordance with a particular embodiment.

FIG. 22 illustrates three gestures input using a handheld device with varying levels of precision. In the illustrated embodiment, the intended gesture comprises an "O." Gesture movement 350 is input as a perfect "O," or with 100% precision for the intended gesture. Gesture movement 352 is input with less than 100% precision as it does not form a perfect "O." Gesture movement 354 is input with less precision than gesture movement 352. The precision requirement for the input of gesture "O" may be set at handheld device to accept varying levels of precision. For example, the precision level may be set such that only gesture movement 350 is recognized as gesture "O," gesture movements 350 and 352 are both recognized as gesture "O" or gesture movements 350, 352 and 354 are all recognized as gesture "O." As indicated above, the higher the precision requirement, then the more space available for additional recognizable gestures. For example, if the precision level for handheld device 10 were set such that only gesture movement 350 was recognized as gesture "O," then gesture movements 352 and 354 may be recognized as other, distinct gestures.

In particular embodiments, handheld devices may alter gestures recognized for performing particular functions based on a user's personal precision. In this manner, a handheld device may have dynamic learning capability of gesture mappings. For example, if a particular gesture of a gesture database is mapped to a particular function, and a user's repeated attempts to input the gesture lack precision in a consistent manner; then the handheld device may alter the gesture in the gesture database to match the consistent gesture movement of the user such that the user's consistent gesture motion input will be mapped to the particular function.

As an example, if a particular gesture comprises a square motion and a user's motion intended for the gesture comprises more of a triangular motion on a consistent basis (e.g., on multiple consecutive times), then the handheld device may be able to recognize this consistent difference in an intended gesture and the actual user motion to change the intended gesture (e.g., a square) in the gesture database mapped to the function intended to the user's actual consistent motion (e.g., triangle). Thus, after such change is made, any time the user inputs the triangle gesture then the function previously mapped to the square gesture will be commanded. The device may determine the gesture intended in any of a variety of ways, such as through two-way communication with the user through any form of input. In particular embodiments, this dynamic learning of users' input characteristics may be applied on a user-specific basis. For example, in the example described above another user may still input the square gesture using the same handheld device to command the same function.

As indicated above, as the precision of user motion with respect to intended gestures increases, then the number of gestures available for mapping to functions increases. In some embodiments, handheld devices may recognize that a user's precision increases over time and the devices may, as a result, increase the gestures available for use. Increasing gestures available for input may also increase the functions capable of being commanded through gesture input.

As an example, a user's personal precision for inputting gestures may be such that the user is only able to input a certain number of gestures that will be recognized by the handheld device. However, over time, the user's personal precision may increase. This increase may be recognized by the handheld device and, as a result, the device may enable additional gestures that the user may use as gesture input. In some embodiments, the enabling of additional gestures may occur when the user's precision increases over a particular precision threshold, or a certain precision level. Since the user's precision has increased, the handheld device will be able to recognize when the user attempts to input these additional gestures. As indicated above, providing additional gestures for input by a user may also increase the number of functions that the user is able to command through gesture input, since each gesture may be mapped to command a different function.

Handheld devices in particular embodiments may also allow users to set and vary noise thresholds of the device. Noise thresholds are the magnitude of motion of the device that must be detected in order to be considered intended motion input (e.g., an intended gesture) of the user. For example, if noise thresholds are set low, then minimal motion of the device may be considered by the device as motion input. However, if noise thresholds are set high, then greater movement of the device would be required before the motion is considered intended input from the user. If, for example, a user is travelling in a car on a bumpy road, the user may desired to set the noise threshold higher so that when the device moves as a result of bumps in the road then such movement may not be considered by the device to be intended motion input.

In particular embodiments, noise thresholds may automatically change at the device based on a modeled environment. For example, if a device determines that the environment comprises traveling in a car, then the device may automatically increase the noise threshold so that minimal movements resulting from the car will not register as user-intended motion.

Figure 23:
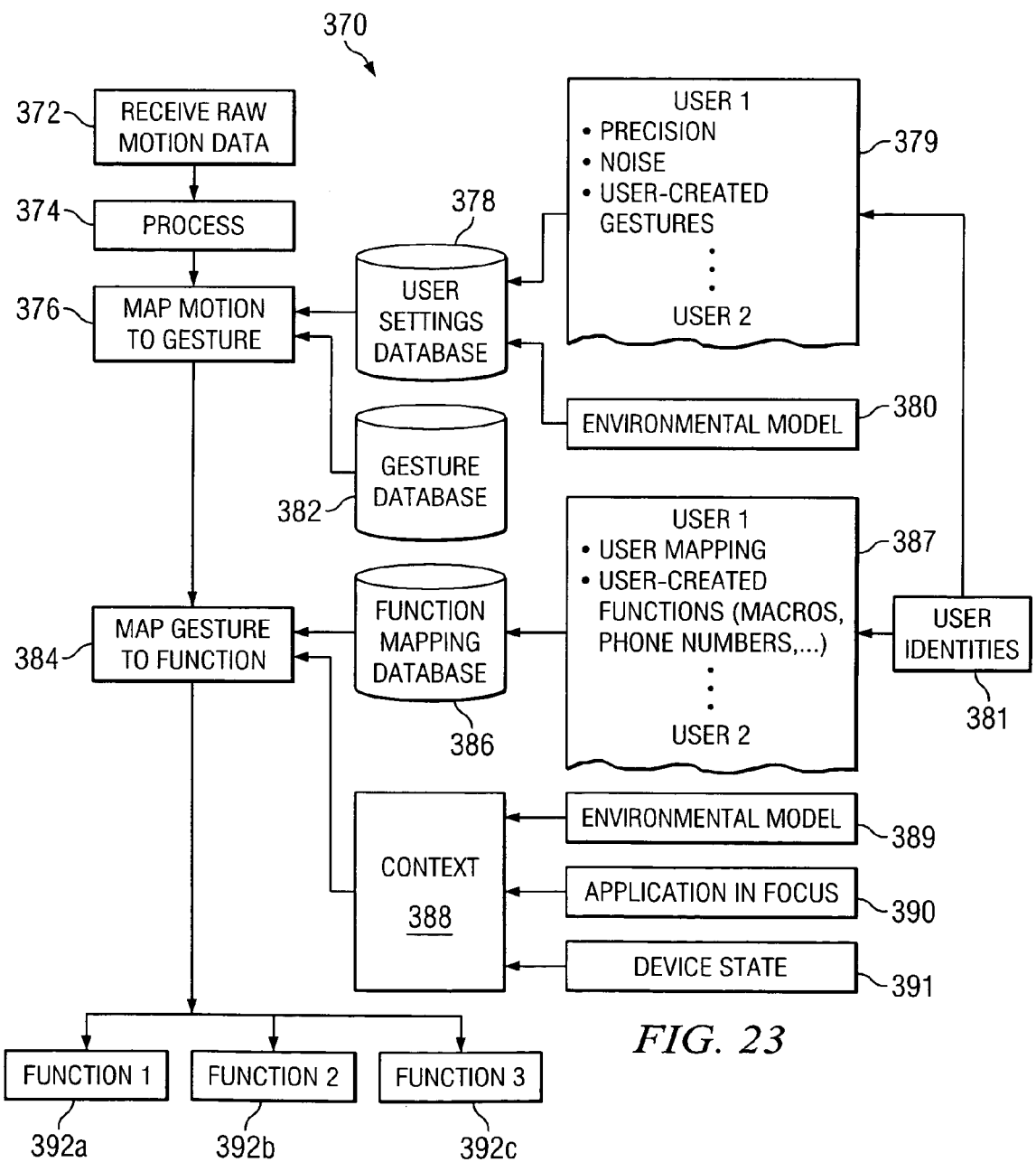
FIG. 23 is a flowchart illustrating a gesture recognition process utilizing a number of features, in accordance with a particular embodiment.

FIG. 23 is a flowchart 370 illustrating a gesture recognition process utilizing a number of features described herein, in accordance with a particular embodiment. At step 372, raw motion data of a particular gesture movement is received. The raw motion data is processed at step 374 where the actual motion of the device is determined. Such processing may include various filtering techniques and fusion of data from multiple detection or sensing components. At step 376, the actual motion is mapped to a gesture. Mapping the actual motion to a gesture may include accessing a user settings database 378, which may include user data 379 comprising, for example, user precision and noise characteristics or thresholds, user-created gestures and any other user-specific data or information including user identities 381. User-specific information may be important, for example, because different users of the handheld device may have different settings and motion input characteristics. For example, an older user may have less precision than a younger user when inputting gestures such that the older person may have fewer gestures available. Moreover, a more experienced user may have more device functionality available through gesture input.

User settings database 378 may also include environmental model information 380 which may factor in determining the gesture applicable at the time. As discussed above, through environmental modeling, the device can internally represent its environment and the effect that environment is likely to have on gesture recognition. For example, if the user is on a train, then the device may automatically raise the noise threshold level. The device may also reduce the precision required, depending upon how crowded the gesture space is near the gesture under consideration. Mapping the actual motion to a gesture may also include accessing gesture database 382.

At step 384, the gesture is mapped to a function for the device. This step may include accessing a function mapping database 386 which may include correlation between gestures and functions. Different users may have different mappings of gestures to functions and different user-created functions. Thus, function mapping database 386 may also include user-specific mapping instructions or characteristics, user-created functions (e.g., macros and/or phone numbers) and any other function information which may be applicable to mapping a particular gesture to one or more functions. In some embodiments, gestures may be mapped to individual keystrokes. User identities 381 may also be accessed in this step. In addition, device context information 388 may also be accessed and utilized in mapping the gesture, which may include environmental model information 389, application in focus information 390 and device state information 391, such as time and date information, location information, battery condition and mode information (e.g., silent mode). At steps 392, the device performs the appropriately-mapped one or more function(s), such as Function 1 at step 392*a*, Function 2 at step 392*b* or Function 3 at step 392*c*.

As discussed above, in particular embodiments handheld device 10 may comprise a cellular phone with many of the capabilities described herein. For example, cellular phones with motion input capabilities may use motion input to flatten menus as discussed above. The cellular phone may detect device states and environments, such as free fall or the cellular phone being face down or face up to map to behaviors such as mute, speaker phone and power-off. Other detection of device states may include detecting that the phone is being held to disengage mute or speakerphone states. The cellular phone may utilize gestures to control dialing (e.g., through gestural speed dial) or to lock/unlock a keypad of the device. For example, the device may be moved in a clockwise circle to dial home, a counterclockwise circle to dial work and in the shape of a heart to dial a significant other. Users may also be able to program the cellular phone to customized gestural mappings.

In particular embodiments handheld device 10 may comprise a digital camera utilizing motion input for at least some of the functions described herein. For example, digital cameras with motion input capabilities may use motion input to flatten menus as discussed above. Motion may also be used to allow a user to zoom in (and back out) on still photos or video to examine it more closely for smoother and more intuitive functionality. Motion may be used to zoom in and out of a number of thumbnails of photographs or video clips so that it is easy to select one or more to review. Virtual desktops may be used to review many thumbnails of many digital photos or video clips or to review many digital photos or video clips by translating the camera or using gestural input. Gestures and simple motions may be used alone or in combination with other interface mechanisms to modify various settings on digital still and video cameras, such as flash settings, type of focus and light sensing mode. Moreover, free fall may be detected to induce the camera to protect itself in some way from damage in an impending collision. Such protection may include dropping power from some or all parts of the camera, closing the lens cover and retracting the lens.

In particular embodiments handheld device 10 may comprise a digital watch utilizing motion input for at least some of the functions described herein. For example, digital watches with motion input capabilities may use motion input to flatten menus as discussed above. In some embodiments, the tapping of the watch or particular gestures may be used to silence the watch. Other functions may also be accessed through taps, rotations, translations and other more complex gestures. These functions may include changing time zones, setting the watch (e.g., setting the time and other adjustable settings), changing modes (e.g., timers, alarms, stopwatch), activating the backlight, using a stopwatch (e.g., starting, stopping and splitting the stopwatch) and starting and stopping other timers.

In some embodiments, motion detection may be separate from a display. For example, a display may be worn on glasses or contacts, and other parts of the handheld device may be dispersed across a user's body such that the display may not be part of the same physically component as the motion input device or component.

As discussed above, particular figures illustrate various methods, flowcharts and processes which may be performed in particular embodiments. It should be understood that steps may be performed in any order, and steps from a particular method, flowchart or process may be combined with other methods, flowcharts or processes or other steps from the same method, flowchart or process in various embodiments without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within handheld device 10, these elements may be combined, rearranged or positioned in order to accommodate particular architectures or needs. In addition, any of these elements may be provided as separate external elements to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A motion controlled handheld device comprising:
    a display having a viewable surface and operable to generate an image;

a motion detection module operable to detect motion of the device within three dimensions and to identify components of the motion in relation to the viewable surface; and a motion response module having a first mode of operation and a second mode of operation;

the motion response module operable in the first mode of operation to monitor the motion of the device, to determine that the motion matches a predetermined mode selection trigger by detecting stabilization of the components of the motion, and, in response to determining that the motion matches the predetermined mode selection trigger, to measure a baseline orientation of the device based on measurements of the components, and to switch to the second mode of operation;

the motion response module operable in the second mode of operation to monitor the motion of the device, to determine movement of the device in relation to the baseline orientation using the components of the motion, and to modify the image in response to the movement.

2. The motion controlled handheld device of claim 1, wherein:

the mode selection trigger comprises an engagement gesture defined by a particular movement of the device with respect to a first position of the device; and the motion response module is operable to determine that the motion matches the predetermined mode selection trigger by:

tracking motion of the device matching to the engagement gesture; and detecting stabilization of components of the motion of the device following detection of the engagement gesture.

3. The motion controlled handheld device of claim 1, wherein the motion response module is further operable in the first mode of operation to disregard motions that do not match the predetermined mode selection trigger.

4. The motion controlled handheld device of claim 1, wherein the motion response module is further operable, upon switching to the second mode of operation, to detect a first motion after entering the second mode of operation, to determine that the first motion fails to match to a predefined set of motions, and to switch to the first mode of operation in response to determining that the first motion fails to match.

5. The motion controlled handheld device of claim 1, further comprising:

a gesture database comprising a plurality of gestures, each gesture defined by a motion of the device with respect to a first position of the device; and a gesture mapping database mapping each of the gestures to a corresponding command; and wherein the motion response module is further operable in the first mode of operation to compare the motion of the device against an engagement gesture to determine whether the motion matches the predetermined mode selection trigger; and the motion response module is further operable in the second mode of operation to match the motion of the device against the gestures to determine a received gesture, to identify the corresponding command mapped to the received gesture, and to execute the identified command to modify the current image.

6. The motion controlled handheld device of claim 5, further comprising:

a first accelerometer operable to detect acceleration along a first axis;

a second accelerometer operable to detect acceleration along a second axis, the second axis perpendicular to the first axis; and a third accelerometer operable to detect acceleration along a third axis, the third axis perpendicular to the first axis and perpendicular to the second axis; and wherein:

the gesture database further defines each of the gestures using a sequence of accelerations;

the motion detection module is further operable to detect motion of the device using accelerations measured by the first accelerometer, the second accelerometer, and the third accelerometer; and the motion response module is further operable to match the accelerations measured by the motion detection module against gesture definitions in the gesture database.

7. A method for controlling a handheld device comprising:

generating an image on a viewable surface of the handheld device;

detecting motion of the device within three dimensions;

identifying components of the motion in relation to the viewable surface;

in a first mode of operation:

monitoring the motion of the device;

determining that the motion matches a predetermined mode selection trigger by detecting stabilization of the components of the motion; and in response to determining that the motion matches the predetermined mode selection trigger, measuring a baseline orientation of the device based on measurements of the components and switching to a second mode of operation;

in the second mode of operation:

monitoring the motion of the device;

determining movement of the device in relation to the baseline orientation using the components of the motion; and modifying the image in response to the movement.

8. The method of claim 7, wherein the mode selection trigger comprises an engagement gesture defined by a particular movement of the device with respect to a first position of the device, the method further comprising:

tracking motion of the device matching to the engagement gesture; and detecting stabilization of components of the motion of the device following detection of the engagement gesture.

9. The method of claim 7, further comprising, in the first mode of operation, disregarding motions that do not match the predetermined mode selection trigger.

10. The method of claim 7, further comprising, upon switching to the second mode of operation:

detecting a first motion after entering the second mode of operation;

determining that the first motion fails to match to a predefined set of motions; and switching to the first mode of operation in response to determining that the first motion fails to match.

11. The method of claim 7, further comprising:

maintaining a gesture database comprising a plurality of gestures, each gesture defined by a motion of the device with respect to a first position of the device; and maintaining a gesture mapping database mapping each of the gestures to a corresponding command; and wherein in the first mode of operation, comparing the motion of the device against an engagement gesture to determine whether the motion matches the predetermined mode selection trigger; and in the second mode of operation, matching the motion of the device against the gestures to determine a received gesture, identifying the corresponding command mapped to the received gesture, and executing the identified command to modify the current image.

12. The method of claim 11, wherein:
the gesture database further defines each of the gestures using a sequence of accelerations; the method further comprising:
detecting acceleration along a first axis;
detecting acceleration along a second axis, the second axis perpendicular to the first axis; and
detecting acceleration along a third axis, the third axis perpendicular to the first axis and perpendicular to the second axis;
detecting motion of the device using accelerations measured by the first accelerometer, the second accelerometer, and the third accelerometer; and
matching the accelerations against gesture definitions in the gesture database to identify potential indicated ones of the gestures.

13. Logic for controlling a handheld device, the logic embodied as a computer program stored on a computer readable medium and operable when executed to perform the steps of:
generating an image on a viewable surface of the handheld device;
detecting motion of the device within three dimensions;
identifying components of the motion in relation to the viewable surface;
in a first mode of operation:
monitoring the motion of the device;
determining that the motion matches a predetermined mode selection trigger by detecting stabilization of the components of the motion; and
in response to determining that the motion matches the predetermined mode selection trigger, measuring a baseline orientation of the device based on measurements of the components and switching to a second mode of operation;
in the second mode of operation:
monitoring the motion of the device;
determining movement of the device in relation to the baseline orientation using the components of the motion; and
modifying the image in response to the movement.

14. The logic of claim 13, wherein the mode selection trigger comprises an engagement gesture defined by a particular movement of the device with respect to a first position of the device, the logic operable when executed to perform the steps of:
tracking motion of the device matching to the engagement gesture; and
detecting stabilization of components of the motion of the device following detection of the engagement gesture.

15. The logic of claim 13, further operable, in the first mode of operation, to disregard motions that do not match the predetermined mode selection trigger.

16. The logic of claim 13, further operable, upon switching to the second mode of operation, to:

detect a first motion after entering the second mode of operation;
determine that the first motion fails to match to a predefined set of motions; and
switch to the first mode of operation in response to determining that the first motion fails to match.

17. The logic of claim 13, further operable when executed to perform the steps of:
maintaining a gesture database comprising a plurality of gestures, each gesture defined by a motion of the device with respect to a first position of the device; and
maintaining a gesture mapping database mapping each of the gestures to a corresponding command; and wherein
in the first mode of operation, comparing the motion of the device against an engagement gesture to determine whether the motion matches the predetermined mode selection trigger; and
in the second mode of operation, matching the motion of the device against the gestures to determine a received gesture, identifying the corresponding command mapped to the received gesture, and executing the identified command to modify the current image.

18. The logic of claim 17, wherein:
the gesture database further defines each of the gestures using a sequence of accelerations; the logic further operable when executed to perform the steps of:
detecting acceleration along a first axis;
detecting acceleration along a second axis, the second axis perpendicular to the first axis; and
detecting acceleration along a third axis, the third axis perpendicular to the first axis and perpendicular to the second axis;
detecting motion of the device using accelerations measured by the first accelerometer, the second accelerometer, and the third accelerometer; and
matching the accelerations against gesture definitions in the gesture database to identify potential indicated ones of the gestures.

19. A motion controlled handheld device comprising:
means for generating an image on a viewable surface of the handheld device;
means for detecting motion of the device within three dimensions;
means for identifying components of the motion in relation to the viewable surface;
means for, in a first mode of operation:
monitoring the motion of the device;
determining that the motion matches a predetermined mode selection trigger by detecting stabilization of the components of the motion; and
in response to determining that the motion matches the predetermined mode selection trigger, measuring a baseline orientation of the device based on measurements of the components and switching to a second mode of operation;
means for, in the second mode of operation:
monitoring the motion of the device;
determining movement of the device in relation to the baseline orientation using the components of the motion; and
modifying the image in response to the movement.

* * * * *

UNITED STATES PATENT AND TRADEMARK OFFICE
CERTIFICATE OF CORRECTION

PATENT NO. : 7,280,096 B2  Page 1 of 1
APPLICATION NO. : 10/807558
DATED : October 9, 2007
INVENTOR(S) : David L. Marvit et al.

It is certified that error appears in the above-identified patent and that said Letters Patent is hereby corrected as shown below:

Column 23, Line 43, after "computer" delete "witlessly" and insert -- wirelessly --.
Column 27, Line 39, after "detect a" delete "quite" and insert -- quiet --.

Signed and Sealed this

Twenty-first Day of April, 2009

JOHN DOLL
*Acting Director of the United States Patent and Trademark Office*